US007442123B2

(12) United States Patent
Brill et al.

(10) Patent No.: US 7,442,123 B2
(45) Date of Patent: Oct. 28, 2008

(54) GAMING DEVICE HAVING MECHANICAL INDICATOR WITH VALUES AND MODIFIERS AND SELECTION OF VALUES AND MODIFIERS

(75) Inventors: Zeke Brill, Reno, NV (US); Anthony J. Baerlocher, Reno, NV (US); Karen M. Cregan, Reno, NV (US); Michael MacVittie, Reno, NV (US); Hans Elias, Reno, NV (US)

(73) Assignee: IGT, Reno, NV (US)

(*) Notice: Subject to any disclaimer, the term of this patent is extended or adjusted under 35 U.S.C. 154(b) by 486 days.

(21) Appl. No.: 10/948,433

(22) Filed: Sep. 22, 2004

(65) Prior Publication Data

US 2006/0063584 A1 Mar. 23, 2006

(51) Int. Cl.
*G06F 19/00* (2006.01)
*G06F 17/00* (2006.01)
*A63F 13/00* (2006.01)
*A63F 9/24* (2006.01)

(52) U.S. Cl. ............................. 463/20; 463/16; 463/25; 463/40; 237/139; 237/143 R

(58) Field of Classification Search ..................... 463/1, 463/10, 16–25, 28–42; 705/10; 700/91–92
See application file for complete search history.

(56) References Cited

U.S. PATENT DOCUMENTS

| | | | |
|---|---|---|---|
| 1,978,395 | A | 10/1934 | Groetchen |
| 2,545,644 | A | 3/1951 | Benton et al. |
| 3,420,525 | A | 1/1969 | Waders |
| 3,642,287 | A | 2/1972 | Lally et al. |

(Continued)

FOREIGN PATENT DOCUMENTS

| | | | |
|---|---|---|---|
| AU | 199716432 | B2 | 9/1997 |
| AU | A-50327/96 | | 10/1997 |
| DE | 37 00 861 | A1 | 7/1988 |
| DE | 38 11 301 | A1 | 10/1988 |
| EP | 0798676 | A1 | 10/1997 |
| EP | 0926645 | A2 | 6/1999 |

(Continued)

OTHER PUBLICATIONS

4DU Dice Unit Advertisement written by starpoint.uk.com, printed on Sep. 3, 2002.

(Continued)

*Primary Examiner*—John M. Hotaling, II
*Assistant Examiner*—Paul A. D'Agostino
(74) *Attorney, Agent, or Firm*—Bell, Boyd & Lloyd LLP

(57) ABSTRACT

A gaming device includes a symbol generator which includes a plurality of sections. Each of the sections is associated with a symbol. Upon a triggering event, the gaming device determines which symbol to indicate. The gaming device rotates or moves the symbol generator and stops rotating the symbol generator to indicate a first point on the symbol generator. The first point is located between the section associated with the determined symbol and another section adjacent to this section. The gaming device indicates the adjacent section at least once and indicates the section associated with the determined symbol at least once. In one embodiment, the gaming device oscillates the symbol generator back and forth to indicate one section and then the other section to tease the player. The gaming device stops moving or rotating the symbol generator to indicate the section associated with the determined symbol. The gaming device provides an outcome to a player based on the determined symbol.

22 Claims, 25 Drawing Sheets

U.S. PATENT DOCUMENTS

| | | | | | |
|---|---|---|---|---|---|
| 3,735,987 | A | | 5/1973 | Ohki | |
| 3,975,022 | A | | 8/1976 | Figueroa | |
| 4,326,351 | A | | 4/1982 | Heywood et al. | |
| 4,410,178 | A | | 10/1983 | Partridge | |
| 4,621,814 | A | | 11/1986 | Stepan et al. | |
| 4,695,053 | A | | 9/1987 | Vazquez, Jr. et al. | |
| 4,712,799 | A | | 12/1987 | Fraley | |
| 4,732,386 | A | | 3/1988 | Rayfiel | |
| 4,871,171 | A | | 10/1989 | Rivero et al. | |
| 5,058,893 | A | | 10/1991 | Bertram et al. | |
| 5,152,529 | A | | 10/1992 | Okada | |
| 5,259,616 | A | | 11/1993 | Bergmann | |
| D344,296 | S | | 2/1994 | McKay et al. | |
| 5,342,047 | A | | 8/1994 | Heidel et al. | |
| 5,364,100 | A | | 11/1994 | Ludlow et al. | |
| 5,395,111 | A | | 3/1995 | Inoue | |
| 5,397,125 | A | | 3/1995 | Adams | |
| 5,449,173 | A | | 9/1995 | Thomas et al. | |
| 5,524,888 | A | | 6/1996 | Heidel | |
| 5,560,603 | A | | 10/1996 | Seelig et al. | |
| 5,584,763 | A | | 12/1996 | Kelly et al. | |
| 5,584,764 | A | | 12/1996 | Inoue | |
| 5,609,524 | A | | 3/1997 | Inoue | |
| 5,647,798 | A | | 7/1997 | Falciglia | |
| 5,664,998 | A | | 9/1997 | Seelig et al. | |
| D392,340 | S | | 3/1998 | DeSimone | |
| 5,722,891 | A | | 3/1998 | Inoue | |
| 5,752,881 | A | | 5/1998 | Inoue | |
| 5,775,692 | A | | 7/1998 | Watts et al. | |
| 5,779,544 | A | | 7/1998 | Seelig et al. | |
| 5,788,573 | A | | 8/1998 | Baerlocher et al. | |
| 5,823,874 | A | | 10/1998 | Adams et al. | |
| D400,597 | S | | 11/1998 | Hedrick et al. | |
| 5,848,932 | A | | 12/1998 | Adams | |
| 5,851,148 | A | | 12/1998 | Brune et al. | |
| D404,084 | S | | 1/1999 | Hedrick et al. | |
| D406,615 | S | | 3/1999 | Griswold et al. | |
| D406,865 | S | | 3/1999 | Heidel | |
| 5,882,261 | A | | 3/1999 | Adams | |
| 5,890,962 | A | | 4/1999 | Takemoto | |
| 5,911,418 | A | | 6/1999 | Adams et al. | |
| 5,919,088 | A | * | 7/1999 | Weiss | 463/9 |
| 5,927,714 | A | | 7/1999 | Kaplan | |
| 5,934,672 | A | | 8/1999 | Sines et al. | |
| 5,935,002 | A | | 8/1999 | Falciglia | |
| 5,947,820 | A | | 9/1999 | Morro et al. | |
| 5,951,397 | A | | 9/1999 | Dickinson | |
| 5,976,015 | A | | 11/1999 | Seelig et al. | |
| 5,980,384 | A | | 11/1999 | Barrie | |
| 5,984,782 | A | * | 11/1999 | Inoue | 463/20 |
| 5,997,400 | A | | 12/1999 | Seelig et al. | |
| 6,004,207 | A | | 12/1999 | Wilson, Jr. et al. | |
| 6,033,307 | A | | 3/2000 | Vancura | |
| 6,050,895 | A | | 4/2000 | Luciano, Jr. et al. | |
| 6,059,289 | A | | 5/2000 | Vancura | |
| 6,059,658 | A | | 5/2000 | Mangano et al. | |
| 6,062,979 | A | | 5/2000 | Inoue | |
| 6,062,980 | A | | 5/2000 | Luciano | |
| 6,071,192 | A | | 6/2000 | Weiss | |
| 6,086,066 | A | | 7/2000 | Takeuchi et al. | |
| 6,089,977 | A | | 7/2000 | Bennett | |
| 6,089,978 | A | | 7/2000 | Adams | |
| 6,105,962 | A | | 8/2000 | Malavazos et al. | |
| 6,113,098 | A | | 9/2000 | Adams | |
| 6,142,873 | A | | 11/2000 | Weiss et al. | |
| 6,142,874 | A | | 11/2000 | Kodachi et al. | |
| 6,159,095 | A | | 12/2000 | Frohm et al. | |
| 6,159,098 | A | | 12/2000 | Slomiany et al. | |
| 6,162,121 | A | | 12/2000 | Morro et al. | |
| 6,168,520 | B1 | | 1/2001 | Baerlocher et al. | |
| 6,173,955 | B1 | | 1/2001 | Perrie et al. | |
| 6,190,254 | B1 | | 2/2001 | Bennett | |
| D441,030 | S | | 4/2001 | Seelig et al. | |
| D441,031 | S | | 4/2001 | Seelig et al. | |
| 6,210,279 | B1 | | 4/2001 | Dickinson | |
| 6,213,876 | B1 | | 4/2001 | Moore, Jr. | |
| 6,217,022 | B1 | * | 4/2001 | Astaneha | 273/138.1 |
| 6,220,593 | B1 | | 4/2001 | Pierce et al. | |
| 6,224,483 | B1 | * | 5/2001 | Mayeroff | 463/20 |
| 6,227,971 | B1 | | 5/2001 | Weiss | |
| 6,254,481 | B1 | | 7/2001 | Jaffe | |
| 6,267,669 | B1 | | 7/2001 | Luciano, Jr. et al. | |
| 6,270,412 | B1 | | 8/2001 | Crawford et al. | |
| 6,302,790 | B1 | | 10/2001 | Brossard | |
| 6,305,686 | B1 | | 10/2001 | Perrie et al. | |
| 6,315,663 | B1 | | 11/2001 | Sakamoto | |
| 6,328,649 | B1 | | 12/2001 | Randall et al. | |
| 6,334,814 | B1 | | 1/2002 | Adams | |
| 6,338,678 | B1 | | 1/2002 | Seelig et al. | |
| 6,340,158 | B2 | | 1/2002 | Pierce et al. | |
| D458,311 | S | | 6/2002 | Seelig et al. | |
| 6,398,218 | B1 | | 6/2002 | Vancura | |
| 6,398,220 | B1 | | 6/2002 | Inoue | |
| D461,207 | S | | 8/2002 | Seelig et al. | |
| D462,397 | S | | 9/2002 | Baker et al. | |
| 6,450,884 | B1 | | 9/2002 | Seelig et al. | |
| 6,464,582 | B1 | | 10/2002 | Baerlocher et al. | |
| 6,481,713 | B2 | | 11/2002 | Perrie et al. | |
| 6,482,089 | B2 | | 11/2002 | DeMar et al. | |
| 6,533,660 | B2 | | 3/2003 | Seelig et al. | |
| 6,537,152 | B2 | | 3/2003 | Seelig et al. | |
| 6,569,015 | B1 | | 5/2003 | Baerlocher et al. | |
| 6,582,307 | B2 | | 6/2003 | Webb | |
| 6,609,972 | B2 | | 8/2003 | Seelig et al. | |
| 6,634,945 | B2 | | 10/2003 | Glavich et al. | |
| 6,672,960 | B1 | | 1/2004 | B-Jensen | |
| 6,712,694 | B1 | | 3/2004 | Nordman | |
| 6,715,756 | B2 | | 4/2004 | Inoue | |
| 6,726,204 | B2 | | 4/2004 | Inoue | |
| D496,968 | S | | 10/2004 | Baerlocher | |
| 6,905,407 | B2 | * | 6/2005 | Nordman | 463/20 |
| 2001/0024971 | A1 | | 9/2001 | Brossard | |
| 2001/0034260 | A1 | * | 10/2001 | Luciano et al. | 463/16 |
| 2002/0094862 | A1 | | 7/2002 | Inoue | |
| 2002/0142829 | A1 | | 10/2002 | Inoue | |
| 2003/0040355 | A1 | | 2/2003 | Baerlocher | |
| 2003/0040358 | A1 | | 2/2003 | Rothkranz et al. | |
| 2003/0064790 | A1 | * | 4/2003 | Hughs-Baird et al. | 463/20 |
| 2003/0078089 | A1 | | 4/2003 | Gary et al. | |
| 2003/0232643 | A1 | | 12/2003 | Inoue | |
| 2004/0000754 | A1 | | 1/2004 | Inoue | |
| 2004/0009807 | A1 | | 1/2004 | Miller et al. | |
| 2004/0012145 | A1 | | 1/2004 | Inoue | |
| 2004/0014516 | A1 | | 1/2004 | Inoue | |
| 2004/0014517 | A1 | | 1/2004 | Inoue | |
| 2004/0017041 | A1 | | 1/2004 | Inoue | |
| 2004/0018866 | A1 | | 1/2004 | Inoue | |
| 2004/0023710 | A1 | | 2/2004 | McGahn et al. | |
| 2004/0026854 | A1 | | 2/2004 | Inoue | |
| 2004/0036218 | A1 | | 2/2004 | Inoue | |
| 2004/0038726 | A1 | | 2/2004 | Inoue | |
| 2004/0041340 | A1 | | 3/2004 | Inoue | |
| 2004/0053658 | A1 | | 3/2004 | Rothranz | |
| 2004/0053659 | A1 | | 3/2004 | Rothkranz et al. | |
| 2004/0053670 | A1 | | 3/2004 | Rothkranz et al. | |
| 2004/0053671 | A1 | | 3/2004 | Nordman | |
| 2004/0053687 | A1 | | 3/2004 | Miller et al. | |
| 2004/0121840 | A1 | | 6/2004 | Rosander et al. | |
| 2004/0150161 | A1 | | 8/2004 | Inoue | |
| 2004/0155399 | A1 | | 8/2004 | Inoue | |
| 2004/0157658 | A1 | | 8/2004 | Rothkranz | |
| 2004/0180715 | A1 | | 9/2004 | Nordman | |
| 2004/0183251 | A1 | | 9/2004 | Inoue | |

FOREIGN PATENT DOCUMENTS

| | | | |
|---|---|---|---|
| EP | 0944030 | A2 | 9/1999 |
| EP | 0945837 | A2 | 9/1999 |
| EP | 1003138 | A | 5/2000 |
| GB | 912685 | | 12/1962 |
| GB | 2 083 936 | A | 3/1982 |
| GB | 2 096 376 | A | 10/1982 |
| GB | 2 097 160 | A | 10/1982 |
| GB | 2 117 155 | A | 10/1983 |
| GB | 2 170 636 | A | 8/1986 |
| GB | 2 183 882 | A | 6/1987 |
| GB | 2 201 821 | A | 9/1987 |
| GB | 2 226 436 | A | 6/1990 |
| GB | 2 328 311 | A | 2/1999 |
| GB | 2 383 668 | A | 11/2001 |
| JP | 2002-320703 | | 11/2002 |

OTHER PUBLICATIONS

American Bandstand Brochure written by Anchor Games, published in 2001.
Bally Live! Fabulous Global Gaming Expo Advertisement, written by Bally Gaming Systems, published 2002.
Barn Yard Article in Strictly Slots, published in Mar. 2002.
Barn Yard Advertisement written by Aristocrat, not dated.
Big Shot!™ Advertisement published by Aristocrat Technologies, Inc., published in 2002.
Big Top Keno Advertisement published by Aristocrat Technologies, Inc., published in 2000.
Bonus Roulette Brochure written by F. Franco, published prior to Sep. 11, 2003.
Bonus Times Article written by Strictly Slots, published in Jul. 2000.
Buck's Roulette Brochure written by R. Franco, published prior to Sep. 11, 2003.
Chariot's of Fortune Brochure written by R. Franco, published prior to Sep. 11, 2003.
Classic Pot of Gold Brochure written by Ace Coin Equipment Ltd., published prior to Sep. 11, 2003.
Cyberdyne Gaming Brochure written by Cyberdyne Gaming, published prior to Sep. 11, 2003.
Double Diamond Girls Advertisement, written by A.C. Coin and Slot Services Company, published prior to Sep. 11, 2003.
Double Dice Advertisement, written by Errel products, published prior to Sep. 2002.
Elvira® Mistress of the Dark™ Advertisement written by IGT, published in 2002.
Elvis Hits Advertisement written by IGT, published in 1999.
Holy Smoke Brochure written by Impulse Gaming Ltd., published prior to Sep. 11, 2003.
Honeymooners Advertisement, written by AC Coin & Slot, published in 2002.
Jack and the Beanstalk™ Brochure written by AC Coin & Slot, published prior to Sep. 11, 2003.
Jackpot Hotline Advertisement, written by AC Coin and Slot, published prior to Sep. 11, 2003.
King of the Grill™ Brochure written by AC Coin & Slot, published prior to Sep. 11, 2003.
Lemons, Cherries and Bell-Fruit-Gum written by Richard M. Bueschel, pp. 39-41, 64, 70, 137, 149-150, 195-196 and 251, 1995.
Let's Make a Deal Publications (5), published prior to 2003.
Line-Up Brochure written by AC Coin & Slot, published prior to Sep. 11, 2003.
Little Green Men Jr.™ Advertisement written by AC Coin & Slot, published prior to Sep. 11, 2003.
Little Green Men Jr.™ Article written by Strictly Slots, published in Feb. 2003.
Mayan Wheel of Gold Advertisement, written by Anchor Games, published prior to 2002.
Mega Jackpots Advertisement, written by IGT, published Winter 1997.
Mill Vest Pocket, written by Horizontal Spinning Reels, published in 1940.
Miss America Brochure written by AC Coin & Slot, published prior to Sep. 11, 2003.
Mix and Match Article written by Strictly Slots, published in Apr. 2002.
Mix and Match Advertisement published by AC Coin & Slot, published prior to Sep. 11, 2003.
Money Grab Article written by Strictly Slots, published in Apr. 2001.
Monopoly Brochures and Articles, published prior to 2002.
Monster Match Game Description by Strictly Slots, published by AC Coin & Slots prior to Sep. 9, 2003.
Monster Match Article, published by Strictly Slots, published in Jan. 2002.
Musical Cherries Advertisement, written by Acres Gaming, published 2000.
On The Money! Article written by Strictly Slots, published in Dec. 2000.
Payout!™ Advertisement written by www.csds.com/Gaming/Products/g Payout.htm, printed on Jan. 15, 2001.
Payout!™ Article written by Casino Data Systems, published prior to Sep. 11, 2003.
Pick a Prize Brochure written by Acres Gaming Incorporated, published prior to 2001.
Pink-n-Pop Advertisement, written by Anchor Games, published in 1999.
Power Slotto Brochure published by AC Coin & Slot prior to 2002.
Press Your Luck Brochure published by AC Coin & Slot prior to 2002.
Quick Pick Paytime Brochure written by Acres Gaming Incorporated, published prior to 2001.
R&B™ Brochure published by AC Coin & Slot, published prior to Sep. 11, 2003.
Reel Dice Advertisement written by Gerber & Glass, published in 1936.
Reel'em In Advertisement, written by WMS Gaming, Inc., printed Jan. 15, 2001.
Reel'em In Advertisement, written by WMS Gaming, Inc., published Sep. 10, 2001.
Royal Roulette Brochure witten by Impulse Gaming Ltd., published prior to Sep. 11, 2003.
Silver City Roundup Advertisement, written by AC Coin & Slot, published prior to Sep. 2002.
Slot Machine Buyer's Handbook, A Consumer's Guide to Slot Machines written by David L. Saul and Daniel R. Mead, published in 1998.
Slot Machines A Pictorial History of the First 100 Years, 5th edition written by Marshall Fey, published in 1983-1997.
Slot Machines and Coin-Op Games written by Bill Kurtz, pp. 16, 65, 105 and 111, 1991.
Slot Machines on Parade, 1st edition written by Robert N. Geddes and illustrated by Daniel R. Mead, published in 1980.
Spin-a-Lot Advertisement, written by Acres Gaming, Inc., published in 2000.
Take Your Pick Article, written by Strictly Slots, published in Mar. 2001.
Take Your Pick Advertisement written by IGT/Anchor Gaming, published in 1999, on or before December thereof.
Top Dollar Advertisement, written by IGT, published in 1998.
Vision Series™/Good Times™ Brochure written by IGT, published in 1999, on or before December thereof.
Wheel & Deal Article, written by Strictly Slots, published in Dec. 2001.
Wheel of Fortune Advertisement, written by Barcrest Ltd., published in 1995.
Wheel of Fortune Advertisements (4), written by IGT, published prior to 2002.
X Factor Brochure and Website Page written by WMS Gaming, Inc., published in 1998, on or before December thereof.
Yahtzee Bonus Advertisement written by Mikohn, published in 1999.

* cited by examiner

GAMING DEVICE HAVING MECHANICAL INDICATOR WITH VALUES AND MODIFIERS AND SELECTION OF VALUES AND MODIFIERS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one known method for enhancing player enjoyment and excitement.

Gaming devices having bonus games generally employ a triggering event that occurs during the operation of the base game of the gaming device. The triggering event temporarily stalls or halts the base game play and enables a player to enter a second, different game, which is the secondary or bonus game. The player plays the bonus game, likely receives an award, and returns to the base game.

Certain gaming machines include one or more wheels which display bonus awards. For example, U.S. Pat. Nos. 5,882,261; 5,911,418; 6,089,918; 6,334,814; 6,605,000 and 6,663,488 disclose such gaming devices Another bonus game is described in U.S. Pat. No. 6,224,483. U.S. Pat. No. 6,224,483 discloses a gaming device having a primary game including several reels with symbols. Multiple paylines are associated with the reels. A bonus game is initiated when the player obtains a specific combination of symbols on the reels. In the bonus game, the player causes a wheel to spin. The wheel includes several awards. The number of spins of the wheel provided to the player in the bonus game is based on the number of paylines that the player played in the primary game, the number of credits wagered on the paylines in the primary game or the specific symbol combination or combinations which occurred on the reels in the primary game. The bonus game ends when the player has no spins remaining. The player receives the total accumulated awards from the spins of the wheel in the bonus game.

Gaming devices that increase the opportunities to obtain awards and increase the size of the awards are desirable. Players are attracted to games that provide several larger awards and the opportunity to obtain a very large award. Therefore, to increase player enjoyment and excitement, it is desirable to provide new games for gaming devices.

SUMMARY OF THE INVENTION

The present invention relates in general to a gaming device, and more particularly to a gaming device which includes a symbol generator and an indicator.

In one embodiment of the present invention, the gaming device includes a symbol generator having a plurality of adjacently arranged sections and a plurality of different symbols. Each of the sections is associated with one of the symbols or includes one of the symbols. Upon a triggering event, the gaming device determines which symbol to indicate. The gaming device moves the symbol generator and stops moving the symbol generator to indicate a first point on the symbol generator. This point is located between the section associated with the determined symbol and an adjacent section. The gaming device then indicates the other or adjacent section at least once and indicates the section associated with the determined symbol at least once. That is, the gaming device oscillates, rotates or otherwise moves the symbol generator back and forth to indicate an adjacent section and then the selected section to tease the player. The gaming device stops moving the symbol generator to indicate the section associated with the determined symbol or to indicate the determined symbol. The gaming device provides the player with an outcome or award based on the determined symbol.

In one embodiment, the symbol generator is a wheel which includes a plurality of adjacently arranged sections. Each section has or displays one of the symbols, images or other suitable indicia. In one embodiment, the symbol generator includes a plurality of values and a plurality of multipliers or modifiers which alternate every other section. For example, one of the sections displays an award value such as a 20 symbol and the sections to the left and to the right of that award section display multipliers, such as a 2× symbol and a 4× symbol. This continues for all of the sections around the wheel in this embodiment.

Upon a triggering event, the gaming device determines which symbol to indicate and rotates the wheel. The gaming device stops the wheel from rotating to indicate a point which is located between the section associated with the determined symbol and one of the other sections on the wheel. In one embodiment, the other section adjoins or is adjacent to the section associated with the determined symbol.

The gaming device begins this tease sequence by rotating the wheel to alternately indicate the section associated with the determined symbol and a section adjacent to it. It should be appreciated that the gaming device may rotate, oscillate or move the wheel any suitable number of times. The gaming device stops moving the wheel and indicates the section associated with the determined symbol. The gaming device provides a player with an award or outcome that is based on the determined symbol which is associated with the indicated section.

In an alternative embodiment, the gaming device includes an indicator that moves to indicate one of the symbols and the symbol generator does not move. In another embodiment, the gaming device moves both the symbol generator and the indicator. In another embodiment, the gaming device includes a plurality of indicators that indicate the symbols or sections.

In another embodiment of the present invention, the symbols displayed or associated with each section of the wheel can function as terminators or activators. When the gaming device stops the wheel from spinning and indicates a terminator symbol on the wheel, the game ends and the gaming device provides a player with an outcome. When the gaming device indicates an activator symbol on the wheel, the gaming device will rotate or spin the wheel again. The gaming device continues the game until it indicates one of the terminators or reaches a predetermined number of spins.

In one such embodiment, the value symbols are designated or function as terminators. In one such embodiment, the multiplier symbols are designated or function as activators. The gaming device accumulates the indicated multipliers. The gaming device continues to spin the wheel and accumulate the indicated multipliers until the gaming device indicates one of the value symbols. The total award is based on the award symbol modified by any accumulated, indicated multiplier symbols. It should be appreciated that any suitable symbol may be designated as a terminator or an activator.

In another embodiment, the modifier symbols are designated or function as terminators. In one such embodiment, the value symbols are designated or function as activators. The gaming device accumulates the value symbols. The gaming device continues to spin the wheel and accumulate the indicated value symbols until the gaming device indicates one of the modifier symbols. The total award is based on any accumulated, indicated value symbols modified by the value of the modifier symbol. It should be appreciated that any suitable symbol may be designated as a terminator or an activator.

In another embodiment, a symbol generator, such as a wheel, is operable to interact with a plurality of player selectable selections. In this embodiment, the gaming device includes a plurality of player selectable selections or choices. The wheel is divided into a plurality of adjacently arranged sections and each section has a symbol. Each selection is associated with one of the symbols or wheel sections. The wheel is operable to interact with the player selectable selections before the wheel moves or during the tease sequence.

In one embodiment, upon a triggering event, the gaming device enables a player to pick at least one of the selections before rotating the wheel. The picked selection determines which symbol to indicate on the wheel. By picking a selection, the player thus determines which symbol the wheel will ultimately indicate. In this embodiment, the gaming device enables a player to pick one of the selections and determines the symbol to indicate. The gaming device rotates the wheel to stop at a point between the section associated with the determined symbol and an adjacent section. The gaming device initiates the tease sequence as described above. The gaming device stops rotating the wheel to indicate the section associated with the determined symbol. The gaming device provides a player an award based on the symbol associated with the picked selection and indicated section.

In another embodiment, a symbol generator, such as a wheel, is operable to interact with a plurality of masked player selectable selections during the tease sequence. The gaming device includes a plurality of player selectable selections. Each of the selections is associated with one of the symbols or a section of the wheel. The gaming device determines or selects a subset of sections which includes two adjacent sections of the wheel. Upon a triggering event, the gaming device spins the wheel and stops spinning the wheel so that the indicator is located between the two adjacent sections of the subset of sections. The gaming device instructs and enables a player to pick one of the player selectable selections. Once the player has picked one of the selections, the gaming device begins the tease sequence described above. The gaming device ends the tease sequence and indicates the symbol associated with the picked selection. The gaming device provides the player with an award based on the indicated symbol.

In another embodiment, the selections are masked and are associated with directions, such as left or right. In this embodiment, the outcome is not determined by the processor. Rather, the outcome of the game or the indicated symbol is determined by which selection the player selects. The gaming device spins the wheel and stops spinning the wheel so that the indicator is located between the two adjacent sections. The gaming device instructs and enables a player to pick one of the player selectable selections. Once the player has picked one of the selections, the gaming device begins the tease sequence described above. The gaming device ends the tease sequence and indicates the symbol in the direction associated with the picked selection. That is, once the player has picked one of the selections, the gaming device indicates the section which is located in the direction of the indicator associated with the picked selection.

For example, the wheel stops spinning so that the indicator is located between a section with a 50 symbol on the left and a 2× symbol on the right. A player selects a selection associated with the direction of left. After the tease sequence, the gaming device indicates the 50 symbol, which was to the left of the indicator.

In another embodiment, a symbol generator, such as a wheel, is operable to interact with a plurality of player selectable selections once the wheel has stopped moving to move the wheel to one other selection. The gaming device includes a plurality of player selectable selections. Each of the selections is associated with a direction. Upon a triggering event, the gaming device spins the wheel and stops spinning the wheel so that the indicator is located between two adjacent sections. The gaming device instructs and enables a player to pick one of the player selectable selections. Once the player has picked one of the selections, the gaming device indicates the section which is located in the direction of the indicator associated with the picked selection. In one embodiment, the gaming device provides the player with an award based on the indicated symbol.

In another embodiment, the gaming device includes a plurality of player selectable selections which are each associated with a direction, such as left or right. The gaming device includes a plurality of symbols displayed or associated with each section of the wheel. A plurality of these sections are designated as or function as activators. A plurality of these sections are designated as or function as terminators. The gaming device spins the wheel and stops spinning the wheel so that the indicator is located between two adjacent sections. The gaming device instructs and enables a player to pick one of the player selectable selections using a suitable input device. In one embodiment, the gaming device begins the tease sequence as described above. The gaming device ends the tease sequence and indicates the symbol in the direction associated with the picked selection. If the symbol is an activator, the gaming device accumulates the value or multiplier associated with that activator symbol and enables the player to pick another selection and spins the wheel again. The gaming device continues the game in this manner until the wheel indicates a terminator. The gaming device continues to spin the wheel and activate symbols until it indicates one of the terminators. It should be appreciated that in this embodiment and the other embodiments described herein, all of the activator symbols may be one type of outcome (such as values), all of the terminator symbols may be another type of outcome (such as modifiers), certain of the activator symbols may be one type of outcome (such as values) and certain of the activator symbols may be another type of outcome (such as modifiers), or any suitable combination thereof.

The game may be implemented in a base game or a bonus game. It should be appreciated that the symbol generators may be reels, wheels, dice or any other suitable type of symbol generator.

It is therefore an advantage of the present invention to provide a gaming device having a symbol generator that provides awards to players.

It is a further advantage of the present invention to provide a gaming device which includes a symbol generator which includes terminator and activator symbols.

It is a further advantage of the present invention to provide a gaming device which includes player interaction with the symbol generator.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Figure 1A:
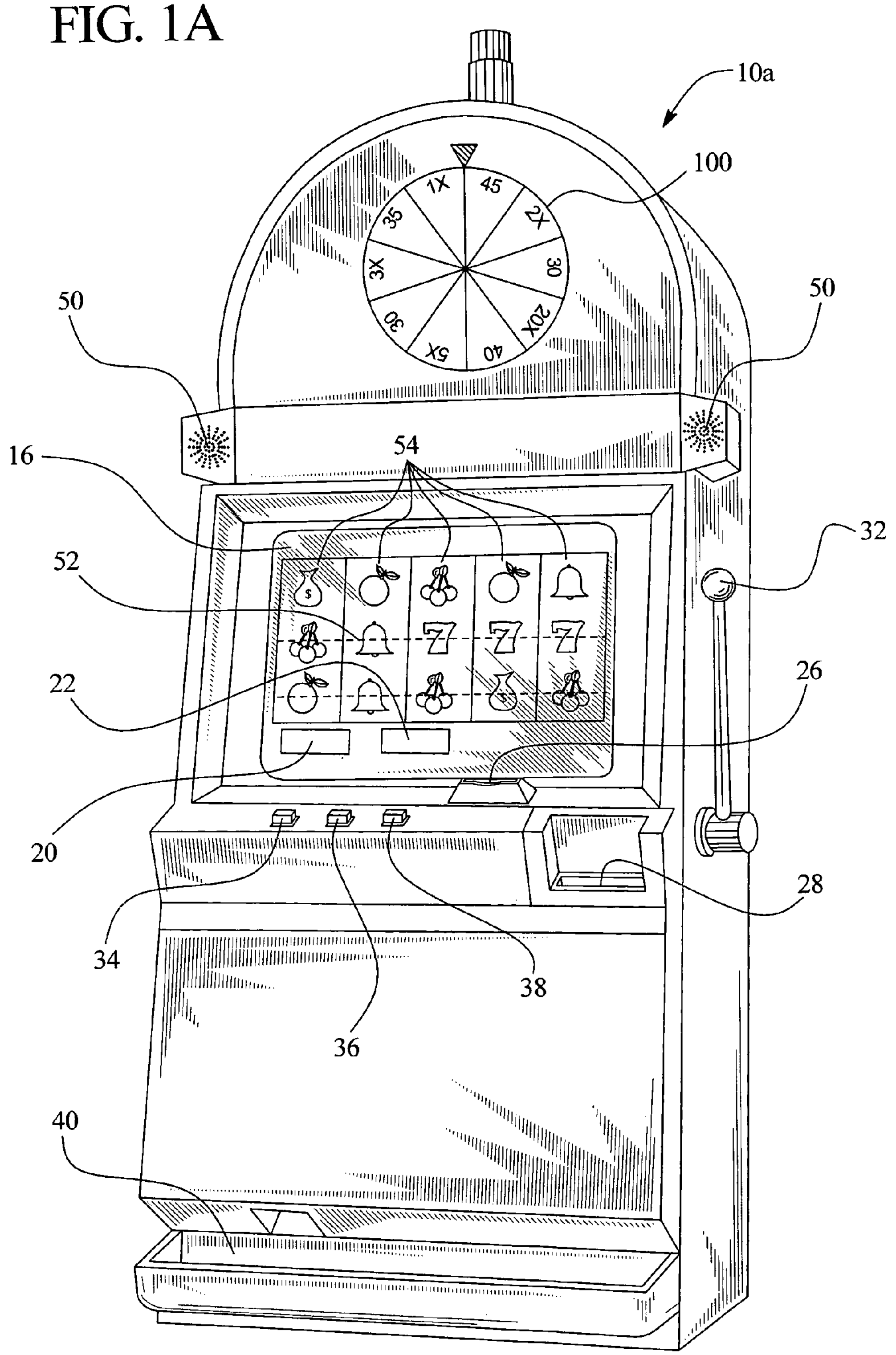
FIG. 1A is a front perspective view of one embodiment of the gaming device of the present invention.
Figure 1B:
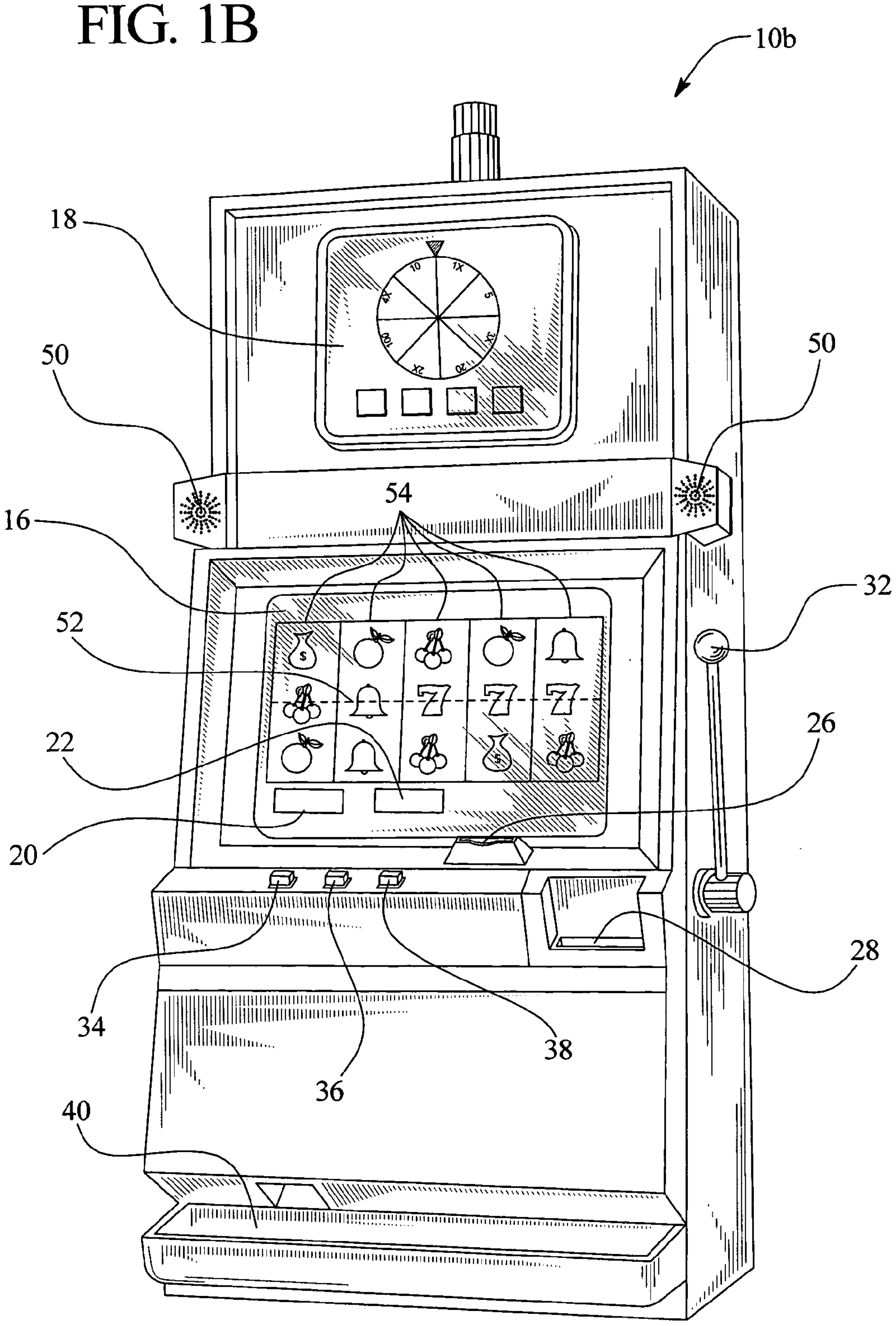
FIG. 1B is a front perspective of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
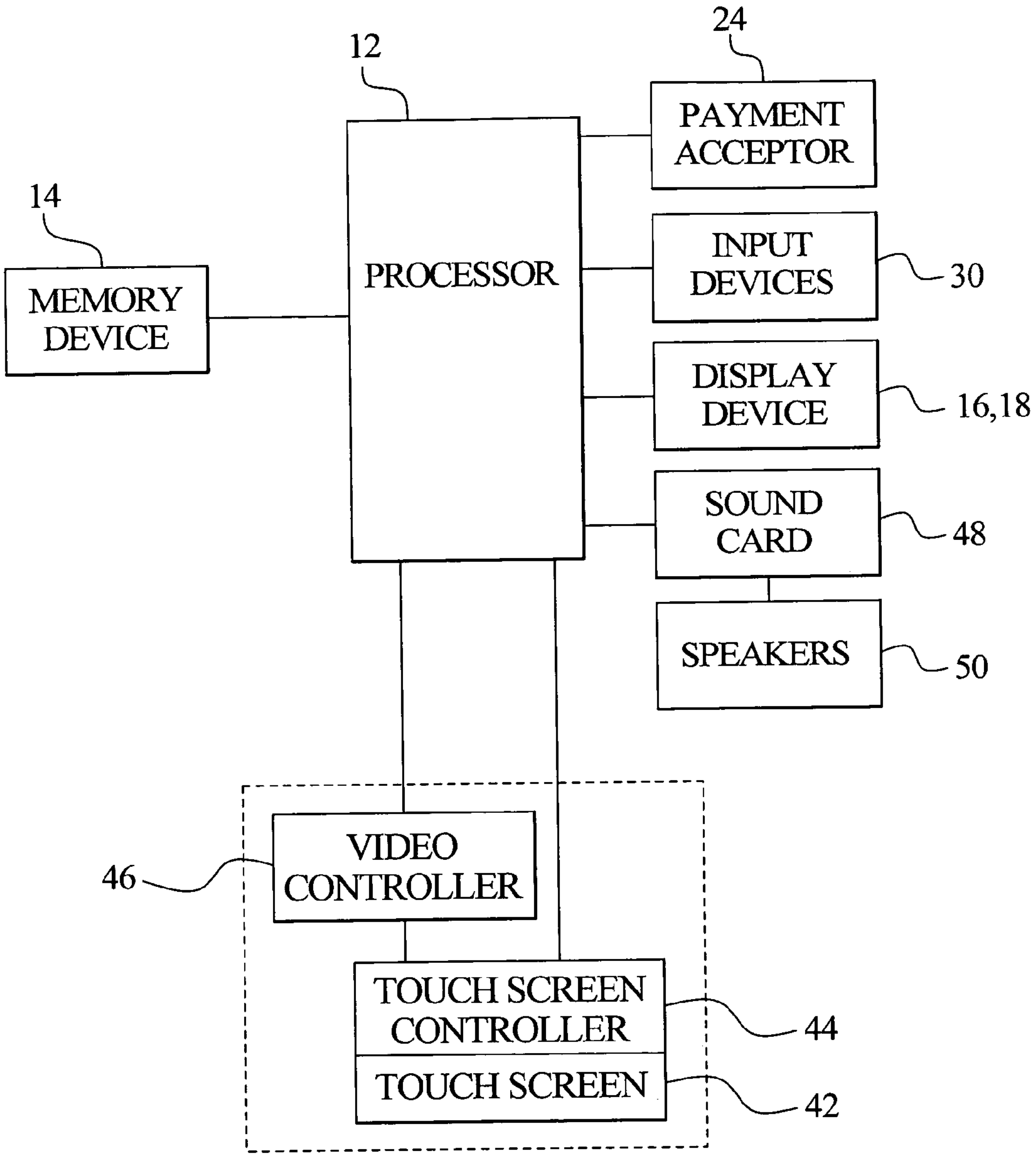
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables at least a portion of the primary or secondary game to be played at a location remote from the gaming device. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD), a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

In one embodiment, as illustrated in FIGS. 1A and 1B, the gaming device includes at least one electromechanical symbol generator, such as a rotatable wheel which is attached to the housing of the gaming device. Each rotatable wheel includes a plurality of sections wherein each section displays a symbol, award, image or other suitable indicia. Each rotatable wheel is associated with and connected to a suitable actuator or motor which is controlled by the processor. The associated actuator or motor is adapted to drive or rotate the rotatable wheel in a clockwise or counter-clockwise direction. In an alternative embodiment, the gaming device includes any suitable electromechanical device which preferably moves one or more mechanical objects, such as one or more mechanical reels or dice, configured to display at least one and preferably a plurality of games or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, the plurality of simulated video reels 54 are displayed on one or more of the display devices as described above. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active payline or otherwise occur in a winning pattern.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game, rather they must win or earn entry through play of the primary game and thus, play of the primary game is encouraged. In another embodiment, qualification of the bonus or secondary game could be accomplished through a simple "buy in" by the player if, for example, the player has been unsuccessful at qualifying through other specified activities.

Figure 2B:
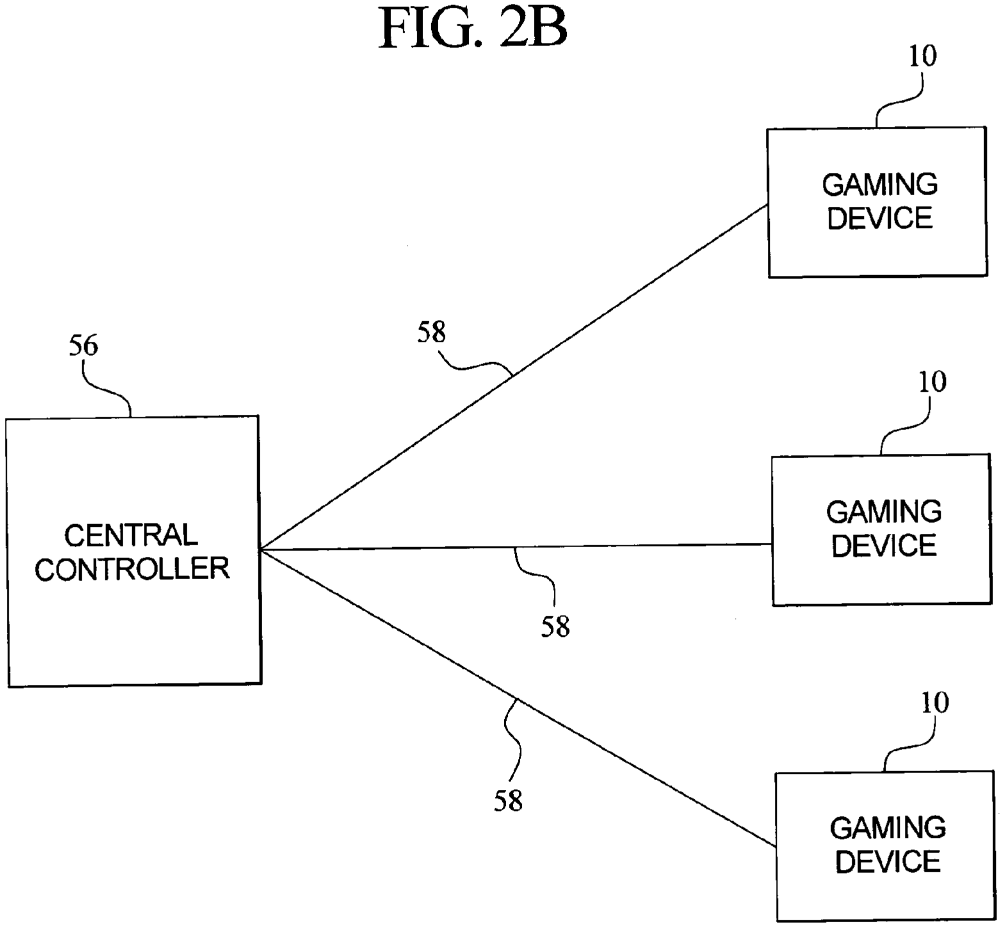
FIG. 2B is a schematic block diagram illustrating a plurality of gaming terminals in communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices is in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Symbol Generator Game

In one embodiment of the present invention, the gaming device includes a symbol generator having a plurality of adjacently arranged sections and a plurality of symbols. Each of the sections is associated with one of the symbols. Upon a triggering event, the gaming device determines which symbol to indicate. The gaming device rotates or moves the symbol generator and stops rotating the symbol generator to indicate a first point on the symbol generator which is located between the section associated with the determined symbol and an adjacent section. The gaming device begins a tease sequence and indicates the determined section. In one embodiment, the symbols of a symbol generator function as activators or terminators. In another embodiment, the gaming device includes a symbol generator which is operable to interact with a plurality of player selectable selections before or during the tease sequence.

Now referring to FIGS. 3A, 3B, 3C, and 3D, in one embodiment of the present invention, the gaming device includes a symbol generator, such as a wheel 100 and an indicator 102. It should be appreciated that the symbol generator may be any suitable type of symbol generator. The wheel includes or displays a plurality of sections 102*a*, 102*b*, 102*c*, 102*d*, 102*e*, 102*f*, 102*g* and 102*h*. In one embodiment, each of the sections have, display or are associated with a symbol 104*a*, 104*b*, 104*c*, 104*d*, 104*e*, 104*f*, 104*g* and 104*h*. The symbols represent values such as game credits, game credit multipliers, a number of free spins, a number of free games, a number of picks from a prize pool, an entry into a bonus game and any combination thereof. The symbols may be any suitable type of symbols or indicia.

Figure 3A:
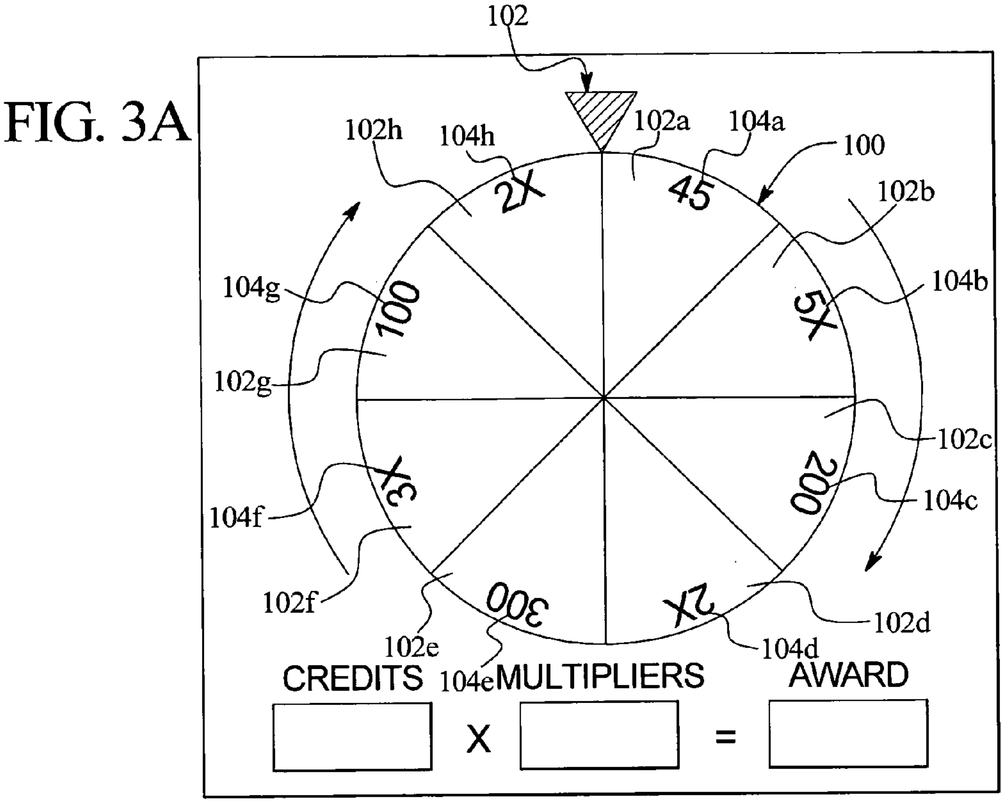
FIGS. 3A, 3B, 3C and 3D are front plan views of one of the symbol generators and indicator of the present invention generally illustrating the tease sequence of the present invention.
Figure 3B:
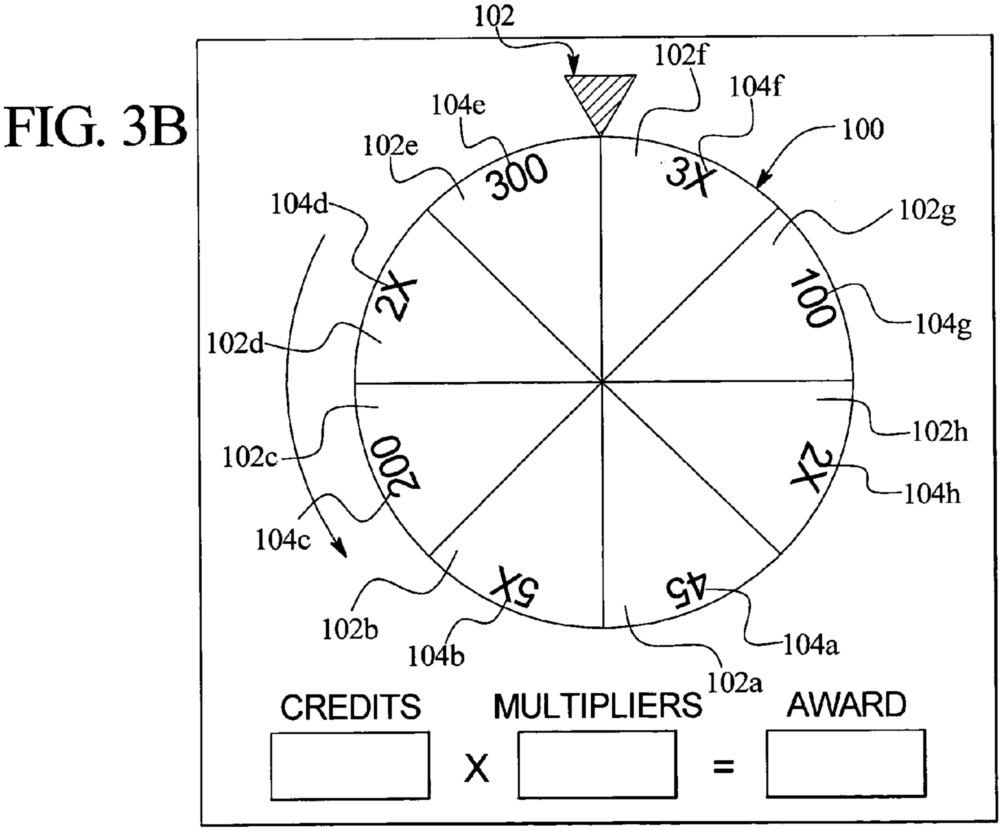

In one embodiment, upon a triggering event, the gaming device determines which of the symbols or sections to indicate. In this example, the gaming device determines to indicate the 300 symbol 104*e*. The gaming device rotates the wheel 100, as illustrated in FIG. 3A. As illustrated in FIG. 3B, the gaming device then stops the rotation of the wheel and indicates a point between the section 102*e* associated with the determined 300 symbol 104*e* and an adjacent section 102*f* which is associated with the 3× symbol 104*f*. The gaming device then begins the tease sequence, as illustrated in FIGS. 3B to 3D, by rotating, moving or oscillating the wheel back and forth between the section associated with the determined 300 symbol and the section associated with the 3× symbol.

Figure 3C:
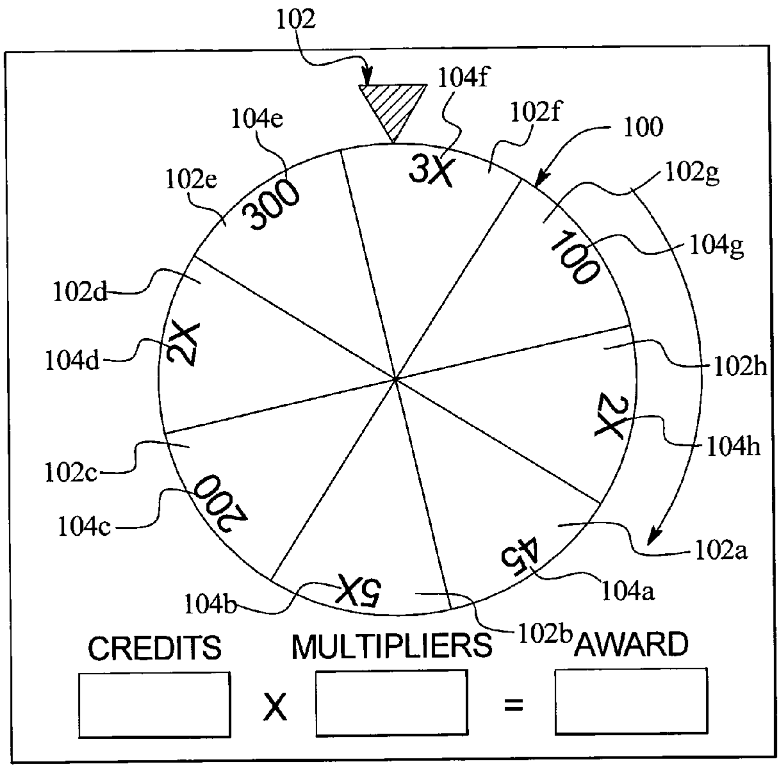
Figure 3D:
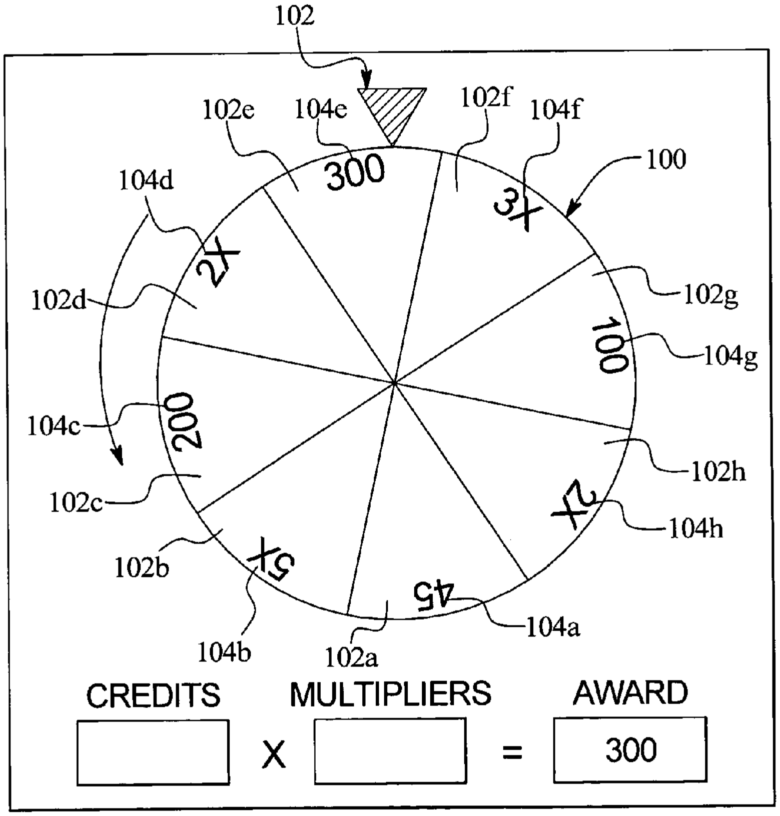

As illustrated in FIG. 3C, the gaming device rotates the wheel to the left to indicate the section 102*f* which is associated with the 3× symbol 104*f*. As illustrated in FIG. 3D, the gaming device then rotates the wheel to the right to indicate the section 102*e* which is associated with the 300 symbol 104*e*. It should be appreciated that the symbol generator may move or rotate and indicate these two symbols or sections any suitable number of times. As illustrated in FIG. 3D, the gaming device stops moving the wheel and indicates the section 104*e* associated with the determined 300 symbol 104*e*. It should be appreciated that the gaming device may determine which symbol to indicate at any suitable time in the game. In one embodiment, the gaming device provides the player with 300 coins or credits and the game ends. In another embodiment, the gaming device provides a player an award based on the indicated symbol.

It should be appreciated that the gaming device may indicate any suitable number of symbols. It should also be appreciated that the award may be determined in any suitable manner. The award indicated to the player is not limited to a number of monetary units or credits, but may indicate any suitable award, such as a point accumulation for the game. It should be appreciated that the symbol generator may be any suitable generator which may generate any suitable symbol. In one embodiment, the gaming device moves the symbol generator to indicate points between two of the sections. In another embodiment, the gaming device moves or rotates the symbol generator to indicate points between a plurality of sections.

In another embodiment illustrated in FIGS. 4A 4B, 4C, 4D, 4E, 4F, 4G, 4H, 4I and 4J, the gaming device includes a symbol generator such, as a wheel 106 which includes an indicator 108 and a plurality of sections 110*a*, 110*b*, 110*c*, 110*d*, 110*e*, 110*f*, 110*g* and 110*h* and which each include or display a plurality of symbols 112*a*, 112*b*, 112*c*, 112*d*, 112*e*, 112*f*, 112*g* and 112*h*. The gaming device includes a credits display 114, a multiplier display 116 and an award display 118. Each of the symbols of the symbol generator is designated as a terminator symbol or as an activator symbol. That is, the symbols displayed or associated with each section function as terminators or activators. The game continues when one of the activators is indicated on the wheel. The game ends when the gaming device indicates one of the terminators. The gaming device provides the player with the game outcome.

Figure 4A:
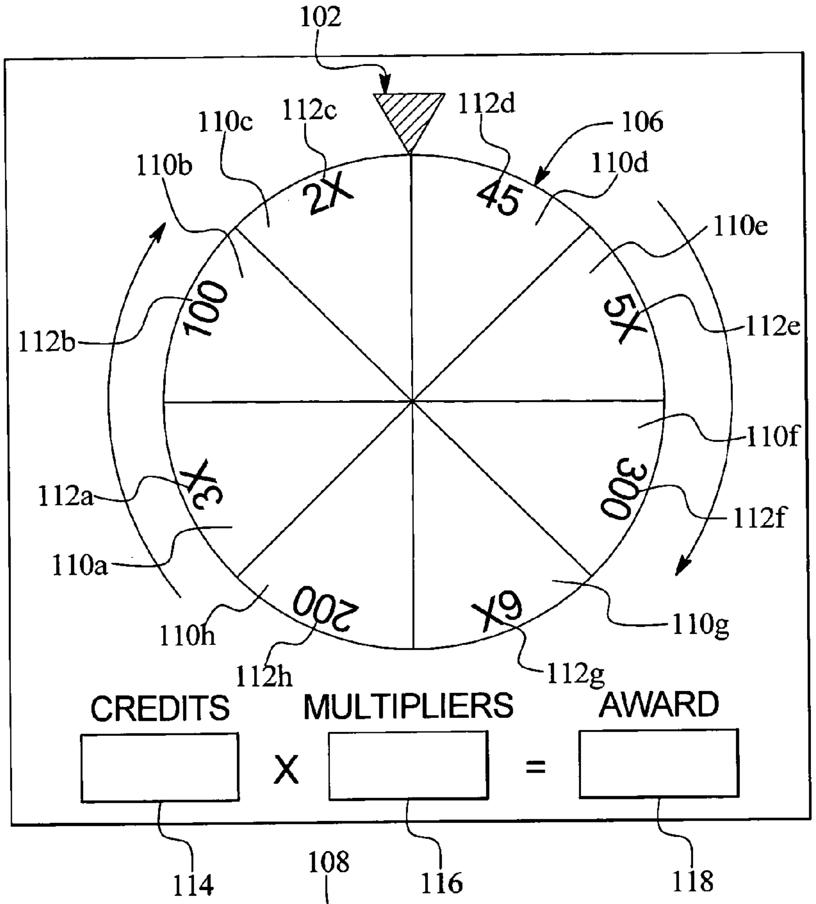
FIGS. 4A, 4B, 4C, 4D, 4E, 4F, 4G, 4H, 4I and 4J are front plan views of the display device of one embodiment of the present invention generally illustrating how symbols function as activators and terminators.

For example, as illustrated in FIG. 4A, the gaming device includes a plurality of value symbols 112*b*, 112*d*, 112*f* and 112*h* and a plurality of multiplier symbols 112*a*, 112*c*, 112*e* and 112*g*. The value symbols function as terminators in this example. That is, when the gaming device indicates the 100 symbol 112*b*, the 45 symbol 112*d*, the 300 symbol 112*f* or the 200 symbol 112, or the sections associated with the value symbols, the game ends or begins a terminating event or terminating sequence. The multiplier symbols function as activators in this example. That is, when the gaming device indicates the 3× symbol 112*a*, the 2× symbol 112*c*, the 5× symbol 112*e* or the 6× symbol 112*g*, or the sections associated with these symbols, the game, accumulates the multiplier and activates or rotates the wheel again. Thus, when the gaming device determines which symbol to indicate, the gaming device determines both the award amount and if the game ends or continues.

As illustrated in FIG. 4A, the gaming device starts the spinning the wheel. The gaming device determines a symbol to indicate when the wheel stops moving. In another embodiment, the gaming device determines a group of symbols to indicate and randomly determines which one to indicate when the wheel stops moving.

Figure 4B:
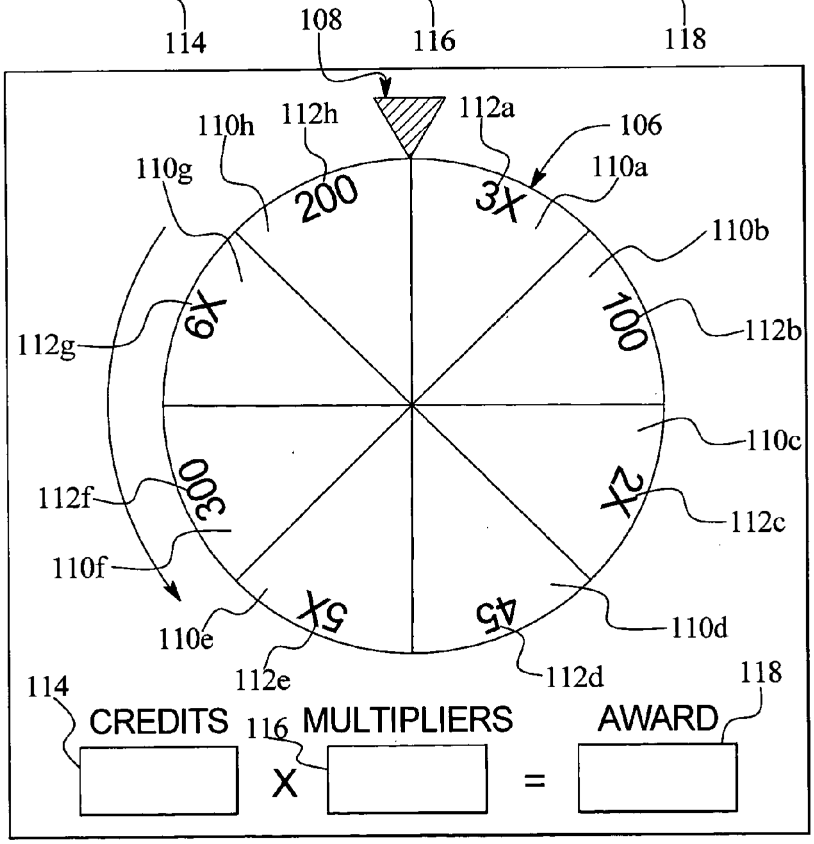
Figure 4C:
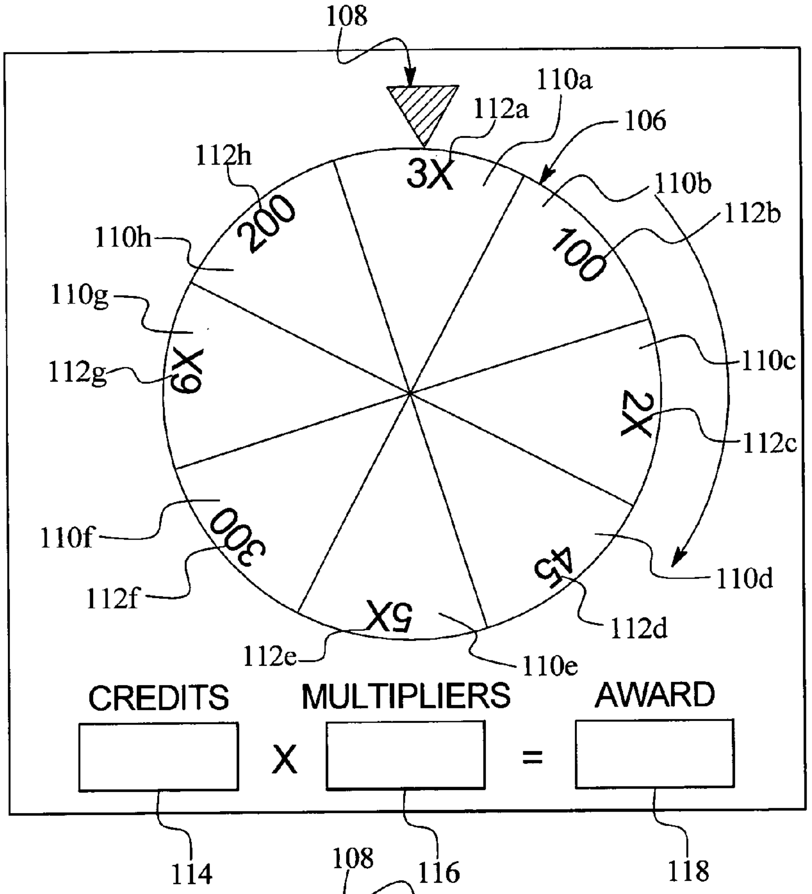
Figure 4D:
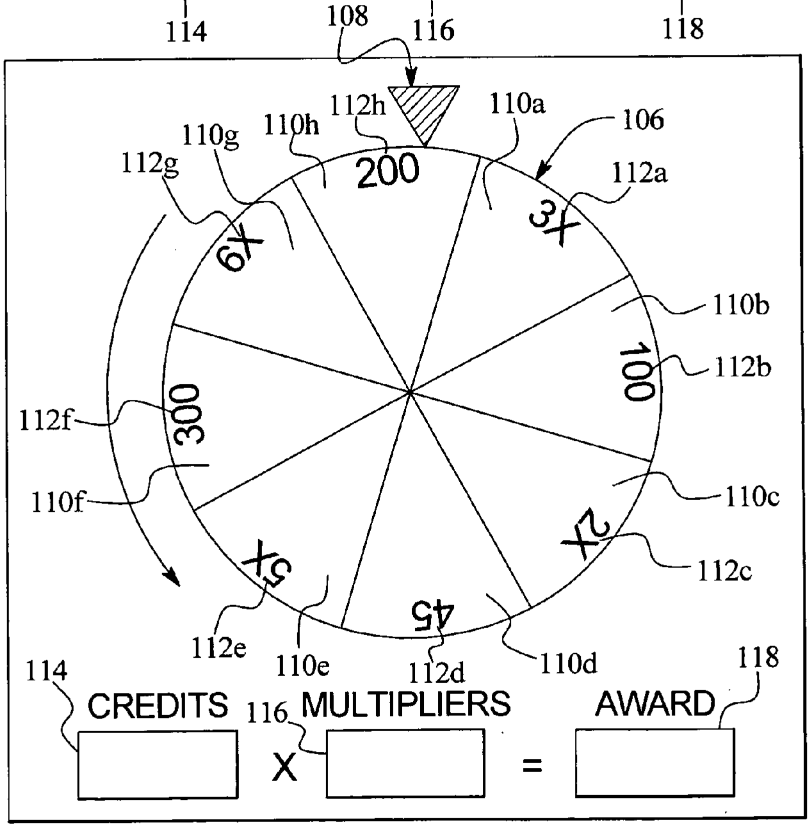
Figure 4E:
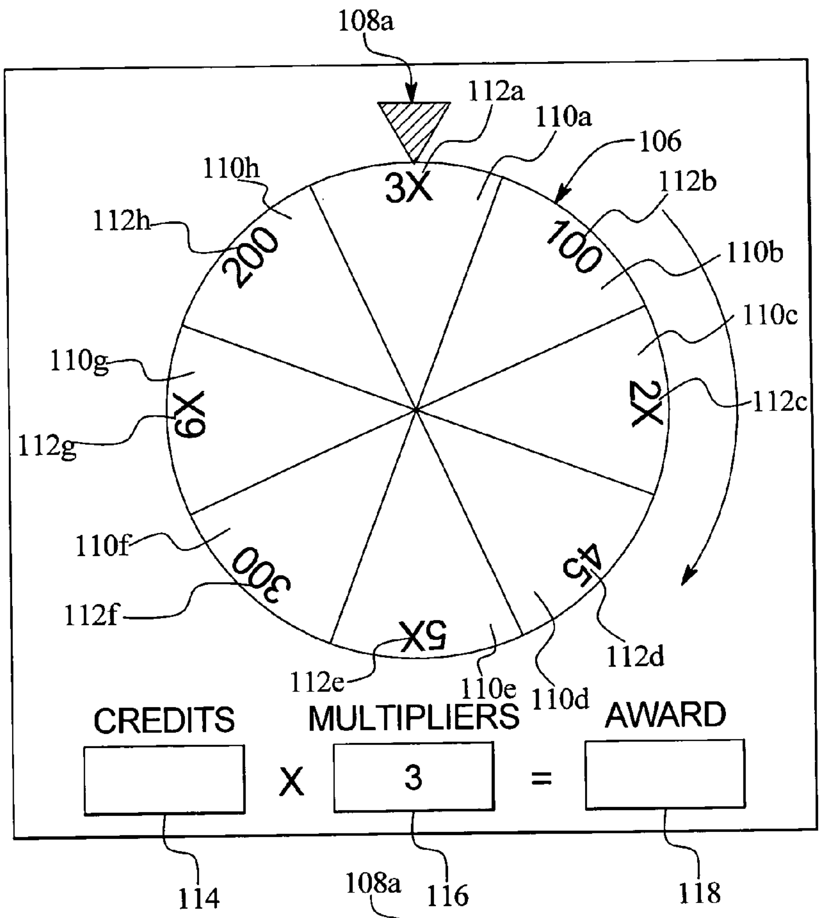

As illustrated in FIG. 4B, the gaming device indicates a point between the 3× symbol 112*a* and the 200 symbol 112*h*. The gaming device begins a tease sequence. As illustrated in FIG. 4C, the gaming device indicates the 3× multiplier symbol 112*a*, which functions as an activator symbol. As illustrated in 4C and 4D, the gaming device then rotates the wheel to the right and indicates the 200 symbol 112*h*. As illustrated in FIGS. 4D and 4E, the gaming device rotates the wheel to the left and indicates the 3× symbol 110*a*. At this point the first tease sequence ends. The gaming device accumulates the determined 3× symbol. The multiplier display 116 displays an accumulated multiplier of 3 for the 3× symbol. The game continues because the gaming device indicated an activator symbol.

Figure 4F:
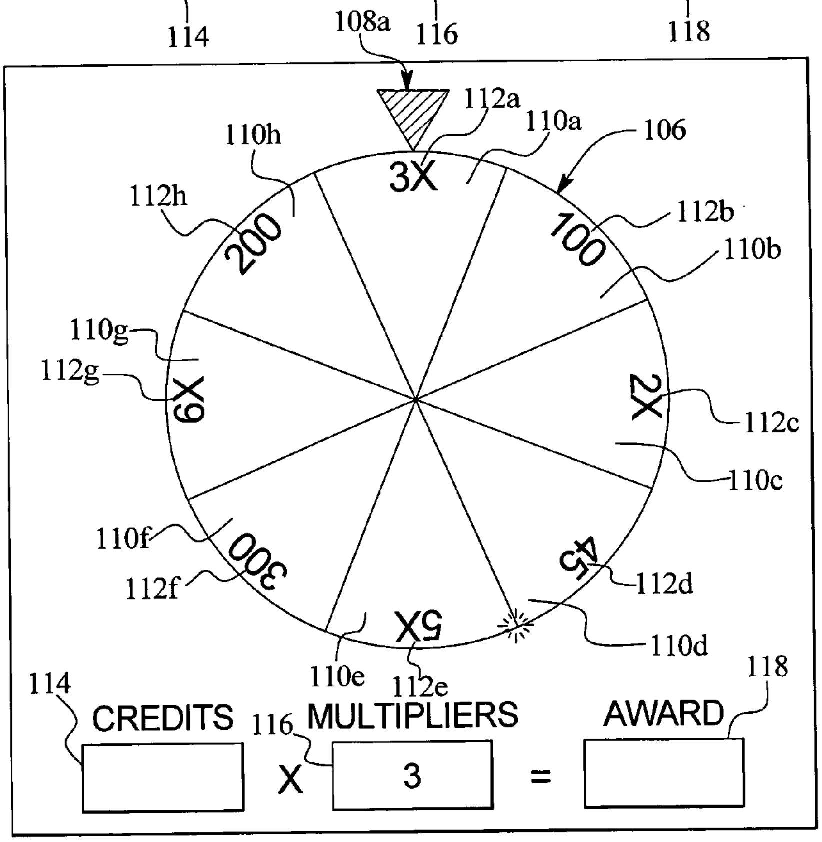
Figure 4G:
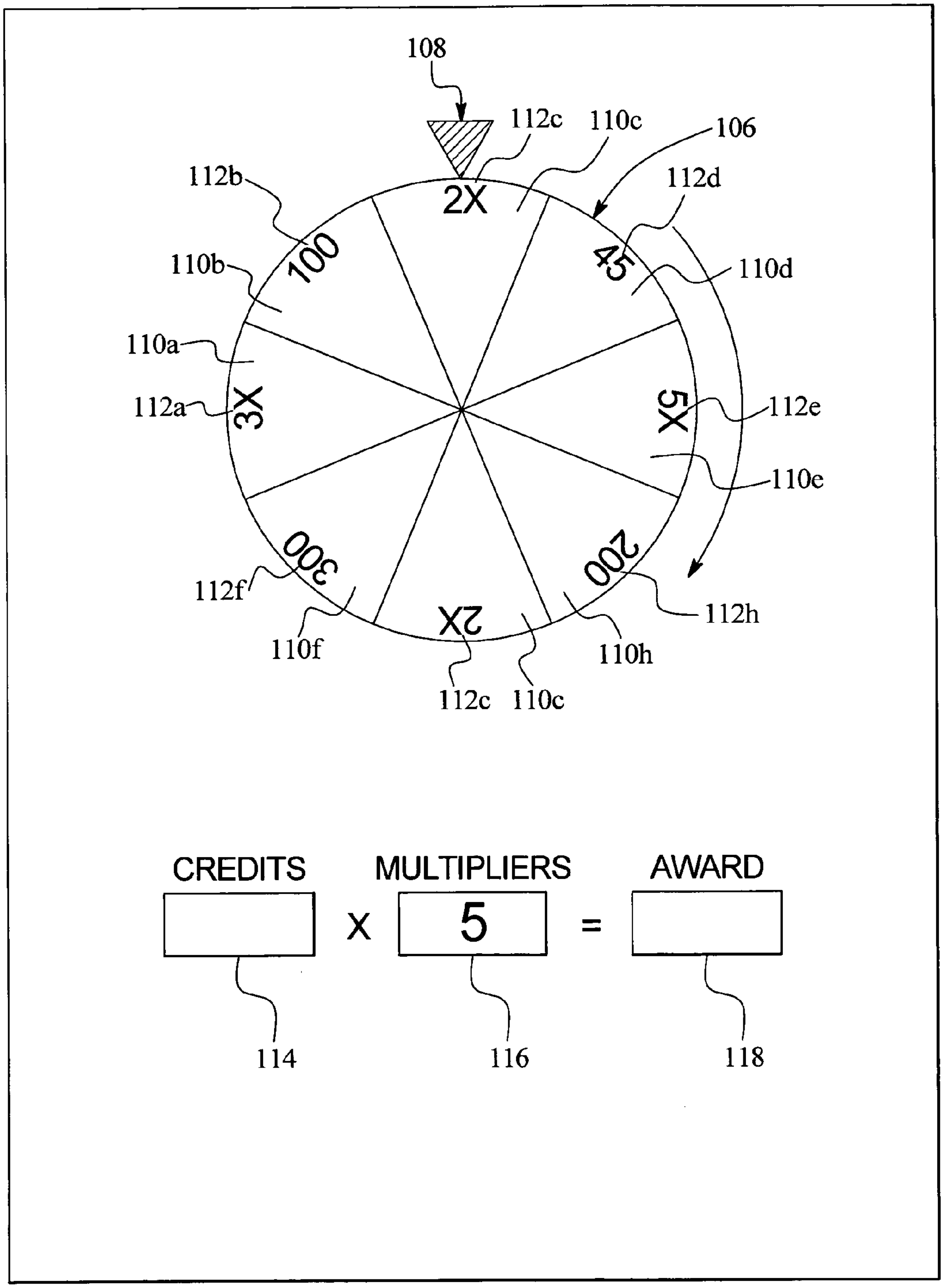

The gaming device makes a determination to indicate the 2× symbol 112*c* next. As indicated in FIG. 4F, the gaming device spins or rotates the wheel again to indicate another point on the wheel. The gaming device indicates a point between the 45 symbol 112*d* and the 2× symbol 112*c*. The gaming device begins the second tease sequence. In this second tease sequence, the gaming device will indicate the determined 2× symbol 112*c*. The gaming device rotates the wheel to the right and stops rotating the wheel to indicate 2× symbol, as illustrated in FIG. 4G. In this spin of the wheel, this indication is the entire tease sequence. Therefore, the gaming device accumulates the indicated multiplier of 2× to the player. The gaming device now displays an accumulated multiplier of five in the multiplier display. The accumulated multiplier of five is the sum of 3× multiplier of three for the first spin of the wheel, and the multiplier of 2 from this spin of the wheel.

Figure 4H:
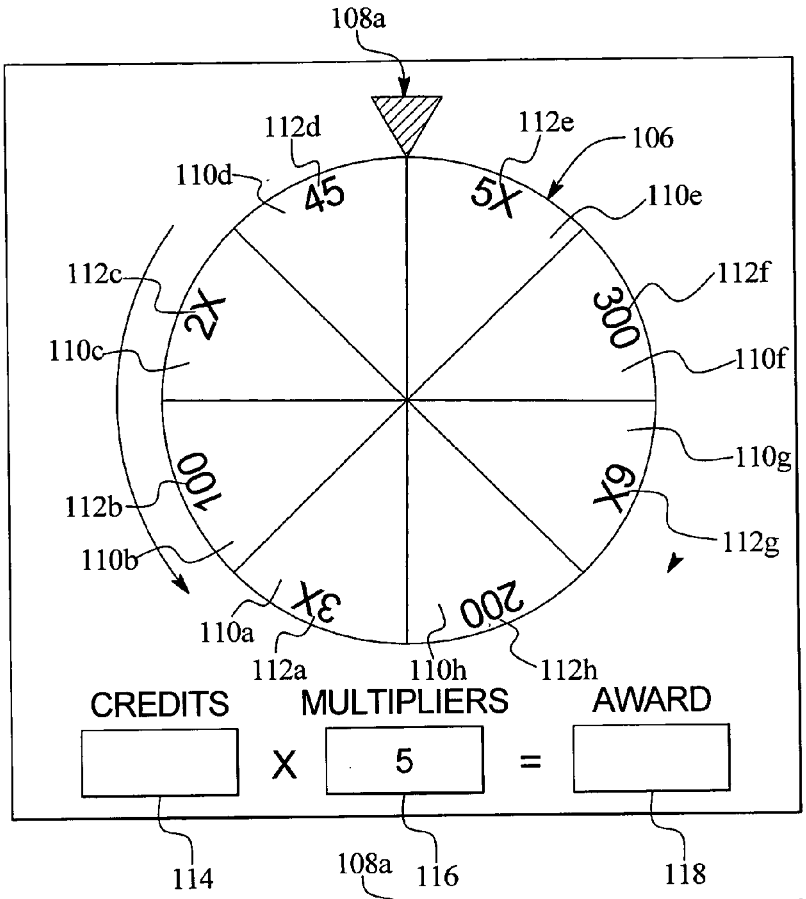
Figure 4I:
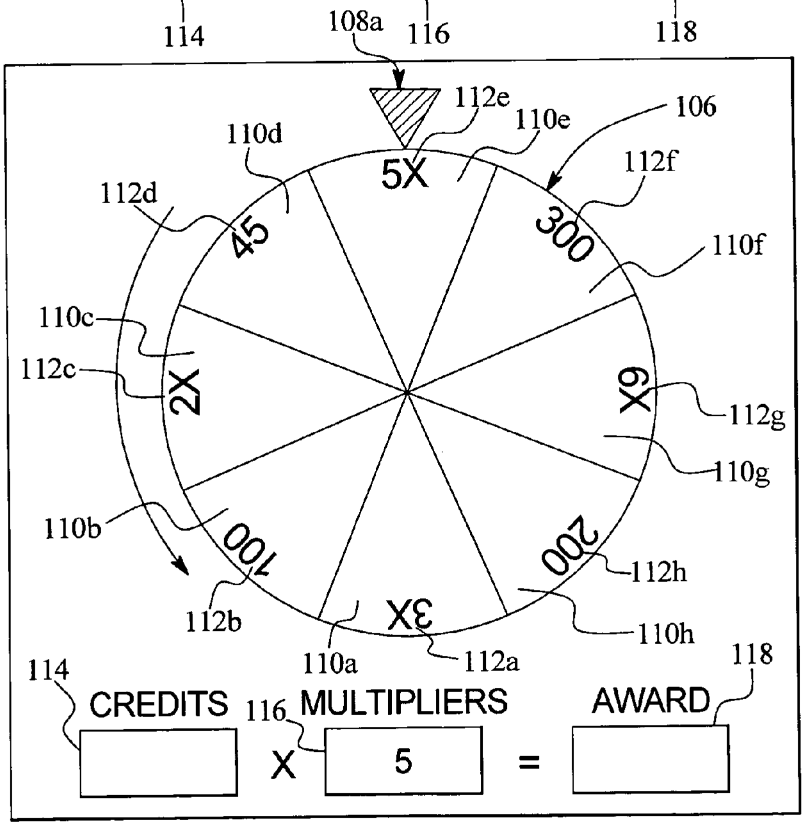
Figure 4J:
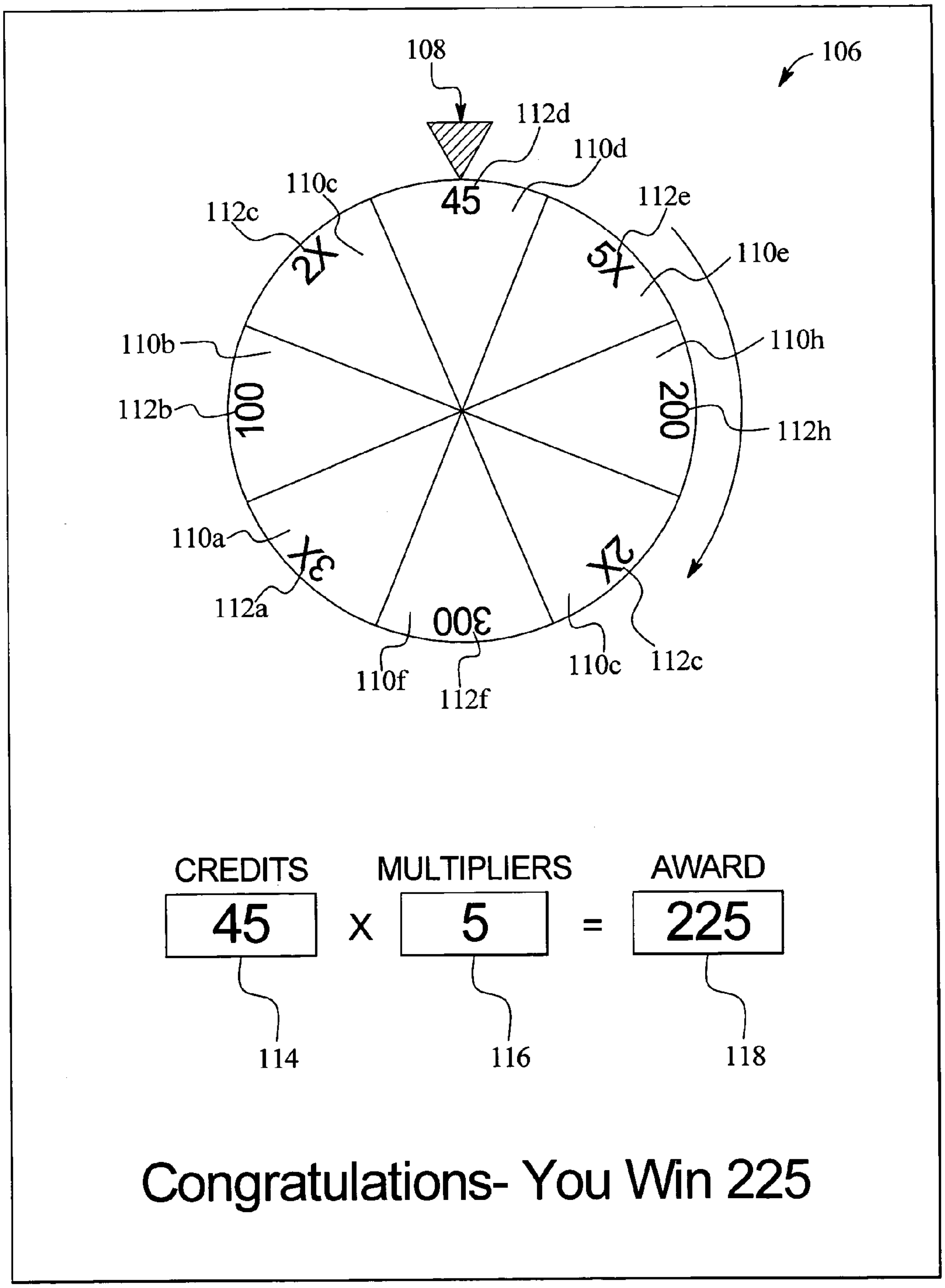

The multiplier 2× symbol is an activator, so the gaming device spins the wheel again. The gaming device determines to indicate the 45 symbol 112*d*. As indicated in FIG. 4H, the gaming device stops the wheel between the determined 45 symbol 112*d* and the 5× symbol 112*e*. The gaming device begins the tease sequence. As illustrated in FIG. 41, the gaming device rotates the wheel to the left to indicate the 5× symbol as illustrated in FIG. 41. The gaming device rotates the wheel to the right to indicate the 45 symbol as illustrated in 4J. The gaming device stops rotating the wheel to ultimately indicate the determined 45 symbol. The game ends when the wheel stops moving to indicate the 45 symbol because the 45 symbol functions as a terminator. The gaming device provides the player with an award based on all of the determined symbols. In this embodiment, the gaming device provides the player with award of the value symbol modified by the accumulated total multiplier symbols. The gaming device multiplies the value of the activator symbol by the amount of the accumulated multiplier symbols and provides the player with an award of 225 credits or monetary units.

It should be appreciated that the determination of which symbol to indicate determines the award. That is, the gaming device determines to indicate a symbol. In this determination the gaming device determines which symbol to indicate. In this determination, the gaming device determines whether to indicate an activator or terminator. The gaming device also determines which activator or terminator to indicate, thus determining the award.

In one embodiment, the gaming device accumulates values. In another embodiment, the gaming device retains the highest value. For example, in this case, the gaming device would keep the 3× symbol from the first spin because it is higher in value than the 2× symbol.

It should be appreciated that the tease sequence may rotate the symbol generator any suitable number of times before indicating a symbol on the symbol generator. It should be appreciated that the activators and the terminators may be any suitable type of symbols or indicia. In one embodiment, the symbol generator provides the same number of activators and terminators. In another embodiment, the symbol generator has a greater number of activators or a greater number of terminators.

In another embodiment, as illustrated in FIGS. 5A, 5B, 5C, 5D and 5E, the gaming device displays a symbol generator, such as a wheel 140, an indicator 142 and a plurality of masked player selectable selections 144, 146, 148, and 150. In this embodiment, the wheel is operable to interact with the plurality of player selectable selections. The wheel includes a plurality of sections 152*a*, 152*b*, 152*c*, 152*d*, 152*e*, 152*f*, 152*g* and 152*h* and each section displays a symbol 154*a*, 154*b*, 154*c*, 154*d*, 154*e*, 154*f*, 154*g* and 154*h*. In one embodiment, each of the masked player selectable selections is associated with one of the sections. In another embodiment, each of the masked player selectable selections is associated with one of the symbols. In another embodiment, at least one of the player selectable selections is not masked.

Figure 5A:
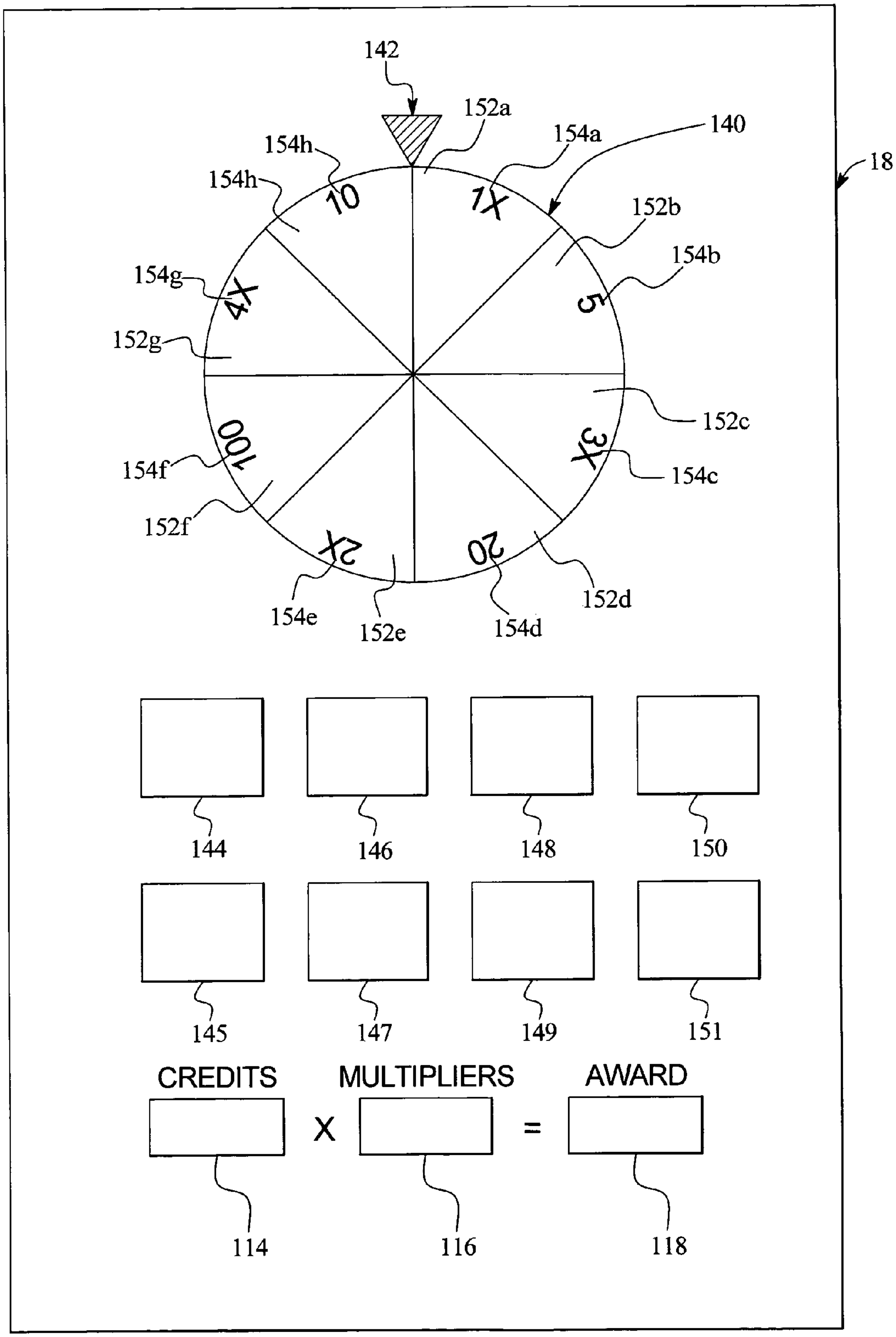
FIGS. 5A, 5B, 5C, 5D and 5E are front plan views of the display device of one embodiment of the present invention generally illustrating a symbol generator which interacts with player selectable selections.
Figure 5B:
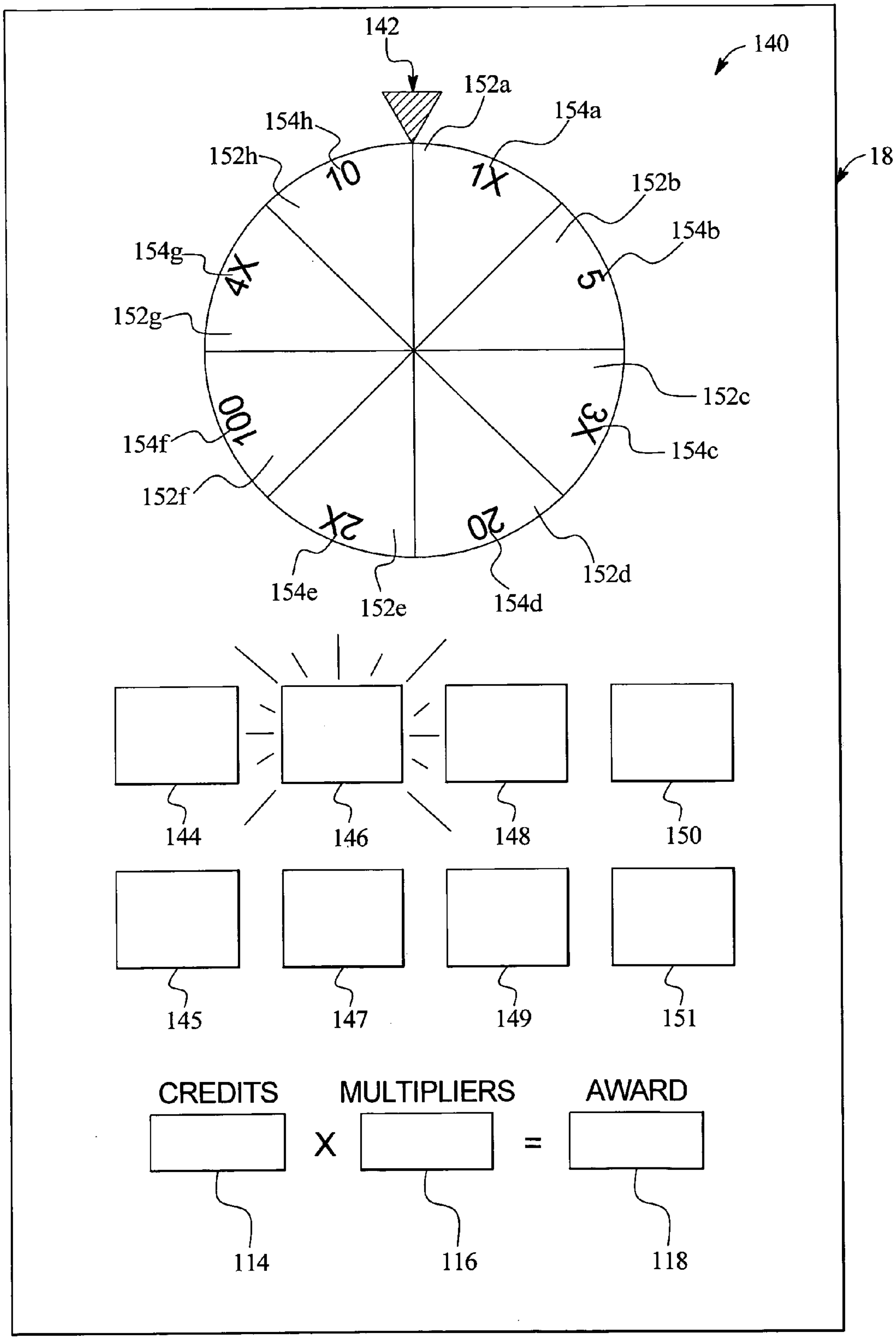

In one embodiment, illustrated in FIG. 5A, upon a triggering event, the gaming device instructs a player to pick one of the selections 144, 145, 146, 147, 148, 149, 150 or 151. The symbol associated with the picked selection will be indicated to the player on the wheel. As illustrated in 5B, the player selects one of the selections 146. The selection is associated with the 100 symbol 154*f*.

Figure 5C:
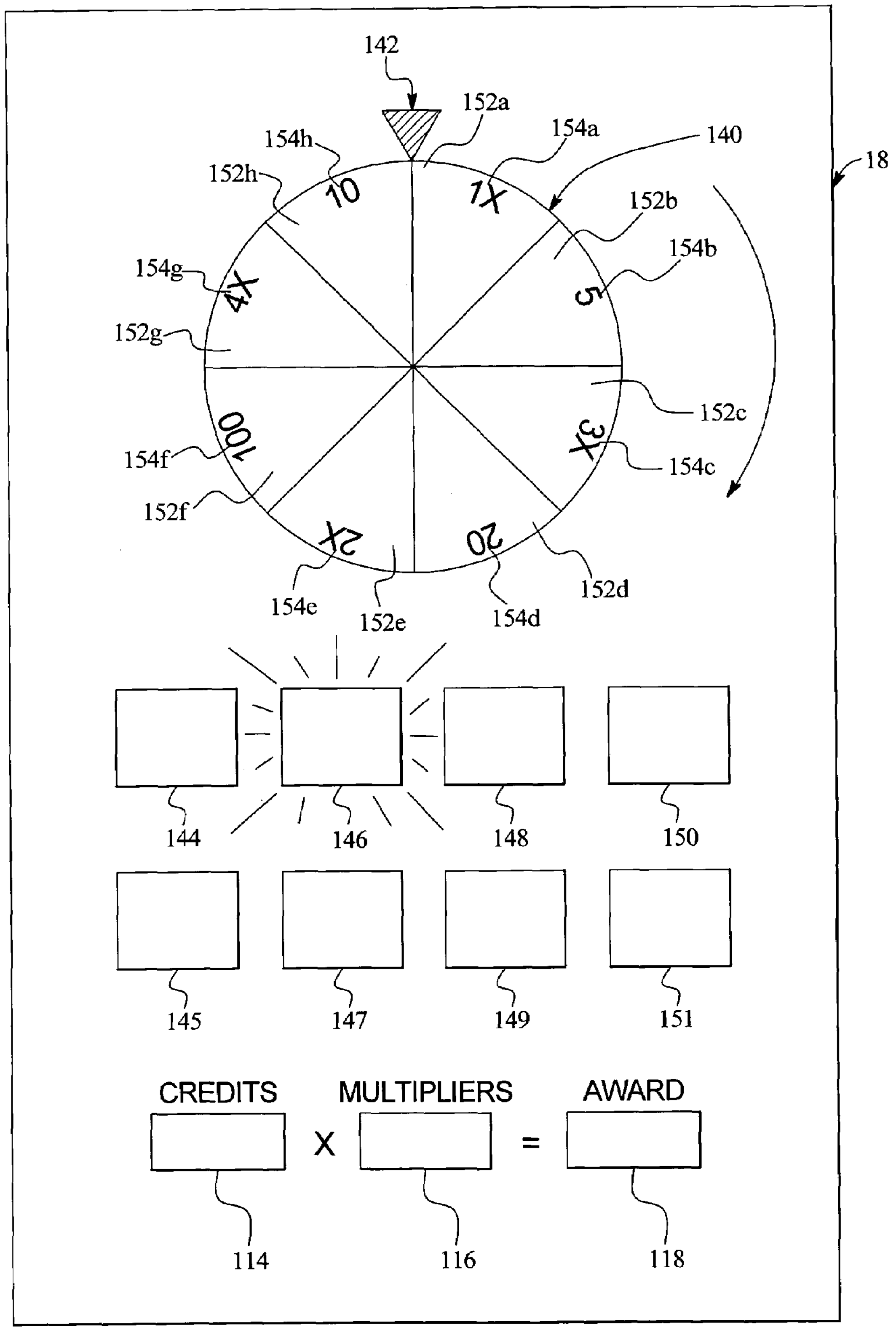
Figure 5D:
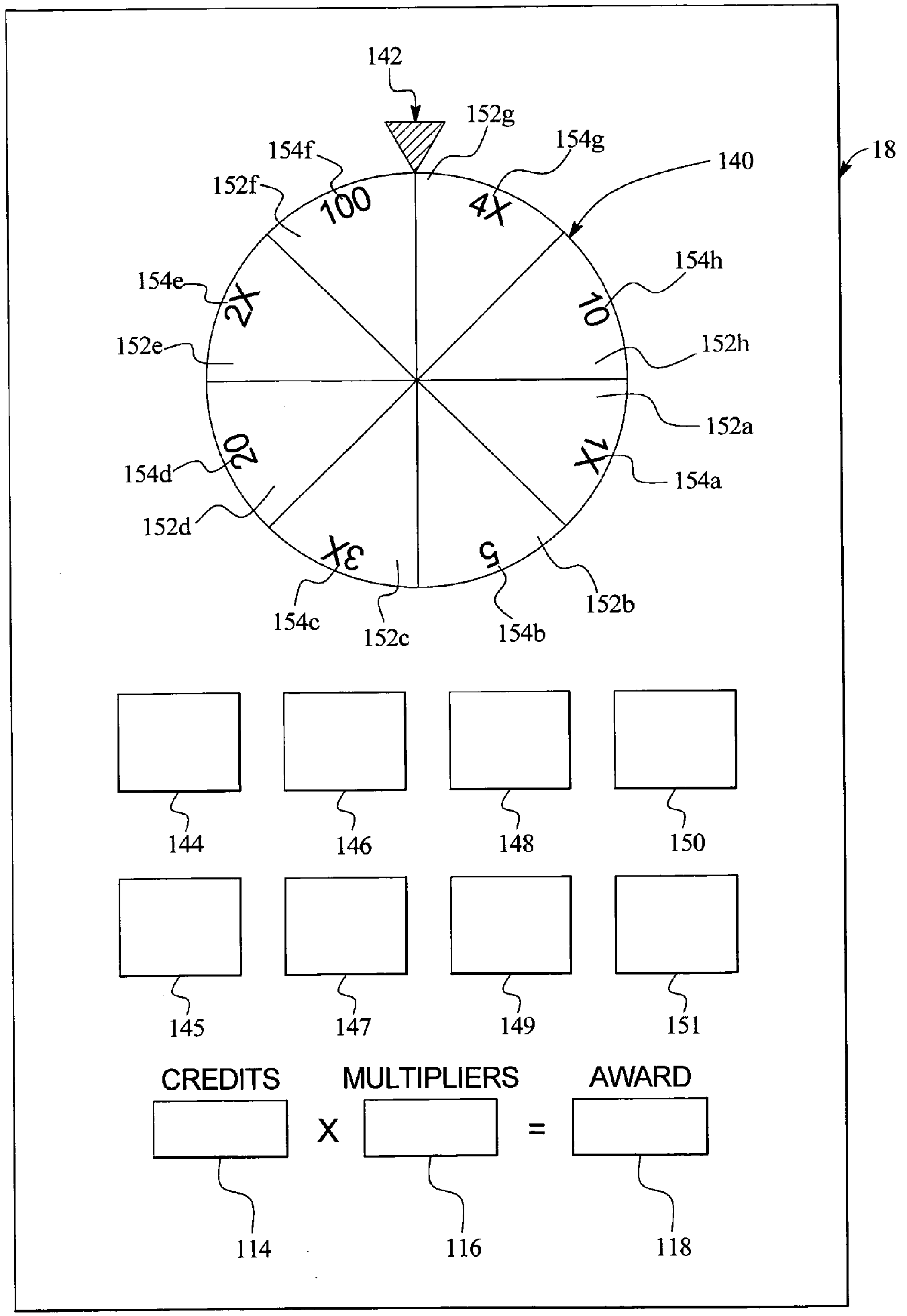

The gaming device rotates the wheel 140, as illustrated in FIG. 5C. The gaming device stops the wheel rotation to indicate a point between the symbol associated with the picked selection 154*f* and one of the other symbols, the 4× symbol 154*g* as illustrated in FIG. 5D. The gaming device initiates the tease sequence as described above (not illustrated).

Figure 5E:
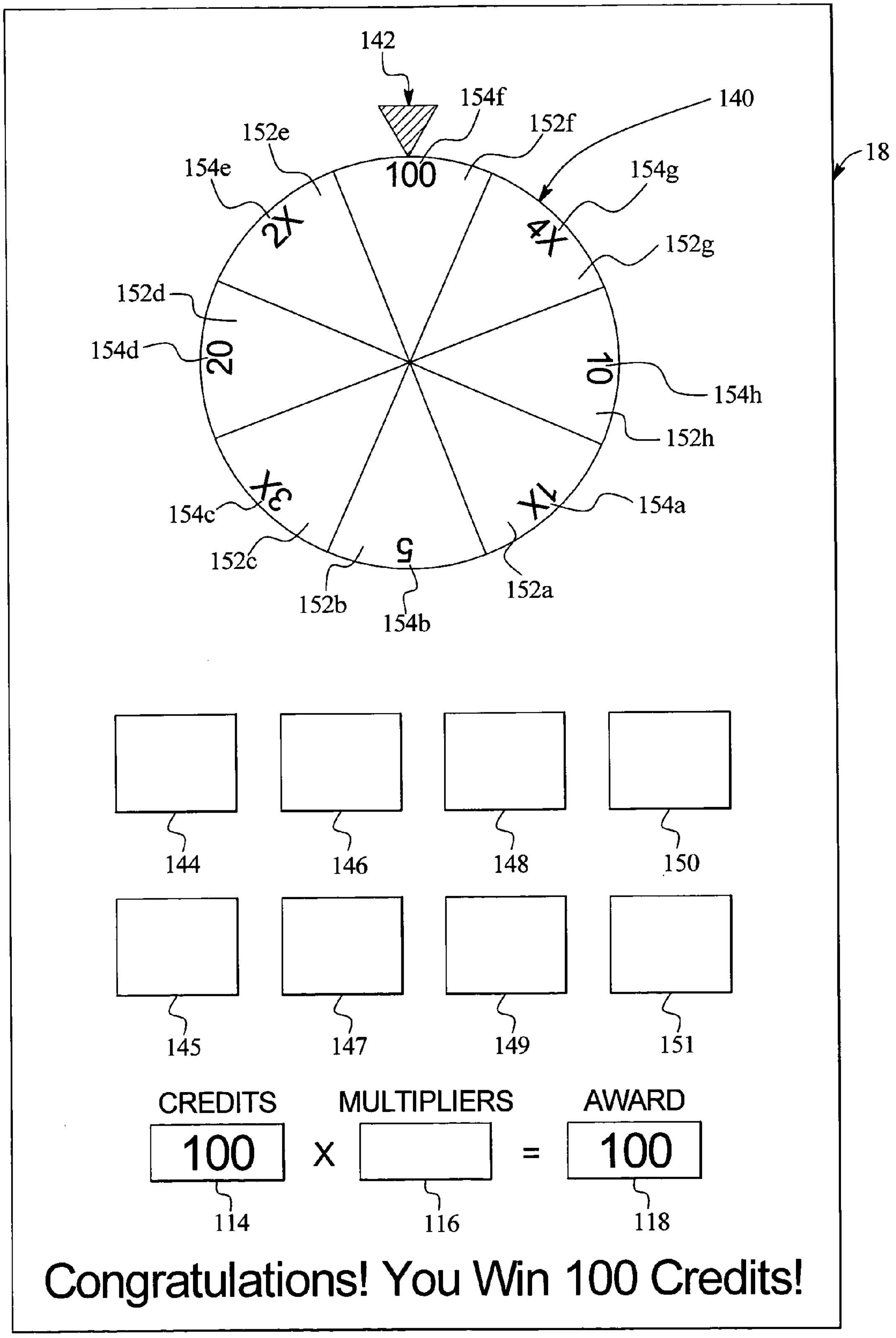

As illustrated in FIG. 5E, the gaming device stops rotating the wheel or terminates the tease sequence to indicate the symbol associated with the picked selection. That is, the gaming device stops rotating the wheel to indicate the 100 symbol 154*f*. The gaming device provides a player with an award based on the 100 symbol.

In another embodiment, a symbol generator, such as a wheel, is operable to interact with a plurality of player selectable selections before or during the tease sequence. The gaming device includes a plurality of player selectable selections. Each of the selections is associated with one of the sections displayed on the wheel. The gaming device determines or selects a subset of selections which includes two sections of the wheel. Upon a triggering event, the gaming device determines the section subset. The gaming device spins the wheel and stops spinning the wheel to indicate a point between the two sections of the section subset. The gaming device instructs and enables a player to pick one of the player selectable selections. Once the player has picked one of the selections, the gaming device begins the tease sequence described above. The gaming device ends the tease sequence and indicates the section associated with the picked selection. The gaming device provides the player with an award based on the symbol associated with the picked selection.

In another embodiment, the selections are associated with directions, such as left or right. After the gaming device spins the wheel and stops spinning the wheel so that the indicator is located between the two adjacent sections. The gaming device instructs and enables a player to pick one of the player selectable selections. Once the player has picked one of the selections, the gaming device begins the tease sequence described above. The gaming device ends the tease sequence and indicates the symbol in the direction associated with the picked selection. That is, once the player has picked one of the selections, the gaming device indicates the section which is located in the direction of the indicator associated with the picked selection.

In another embodiment, a symbol generator, such as a wheel, is operable to interact with a plurality of player selectable selections once the wheel has stopped moving to move the wheel to one other selection. The gaming device includes a plurality of player selectable selections. Each of the selections is associated with a direction. Upon a triggering event, the gaming device spins the wheel and stops spinning the wheel so that the indicator is located between two adjacent sections. The gaming device instructs and enables a player to pick one of the player selectable selections. Once the player has picked one of the selections, the gaming device indicates the section which is located in the direction of the indicator associated with the picked selection. In one embodiment, the gaming device provides the player with an award based on the indicated symbol.

In the illustrated embodiment, each of the selections was associated with one of the sections or symbols of the symbol generator. It should be appreciated that one or more of the selections may be associated with a plurality of the symbols or a plurality of the sections. For example, one selection may be associated with two of the selections. When a player chooses the selection, the gaming device may randomly determine which of the associated sections to indicate. It should also be appreciated that the player selections may be incorporated in any embodiments of the present invention and may be incorporated in any suitable manner.

In another embodiment of the present invention, the gaming device enables a player to determine which section to indicate based on the pick of player selectable selections. The gaming device includes a symbol generator, such as a wheel 160 as illustrated in FIGS. 6A, 6B, 6C, 6D, 6E, 6F, 6G and 6H. The wheel includes a plurality of adjacently sections 164*a*, 164*b*, 164*c*, 164*d*, 164*e*, 164*f*, 164*g* and 164*h* which are associated with or display a plurality of symbols 166*a*, 166*b*, 166*c*, 166*d*, 166*e*, 166*d*, 166*e*, 166*f*, 166*g* and 166*h*. In this embodiment, each of the symbols is designated or functions as an activator or a terminator. In this embodiment, the gaming device designates the value symbols 166*b*, 166*d*, 166*f* and 166*h* as activator symbols. When the gaming device designates or indicates a value symbol, the gaming device continues the game by spinning the wheel again. The gaming device designates the multiplier symbols 166*a*, 166*c*, 166*e* and 166*g* as terminators. When the gaming device indicates one of the multiplier symbols, the game ends. It should be appreciated that the symbol generator may include any suitable symbols. It should also be appreciated that any suitable symbol may be designated as an activator or terminator. The gaming device includes or displays a plurality of player selectable selections 168, 170, 172 and 174. Each of the selections is associated with a direction, such as left or right. The gaming device includes a value display 176, a multiplier display 178 and an award display 180.

Figure 6A:
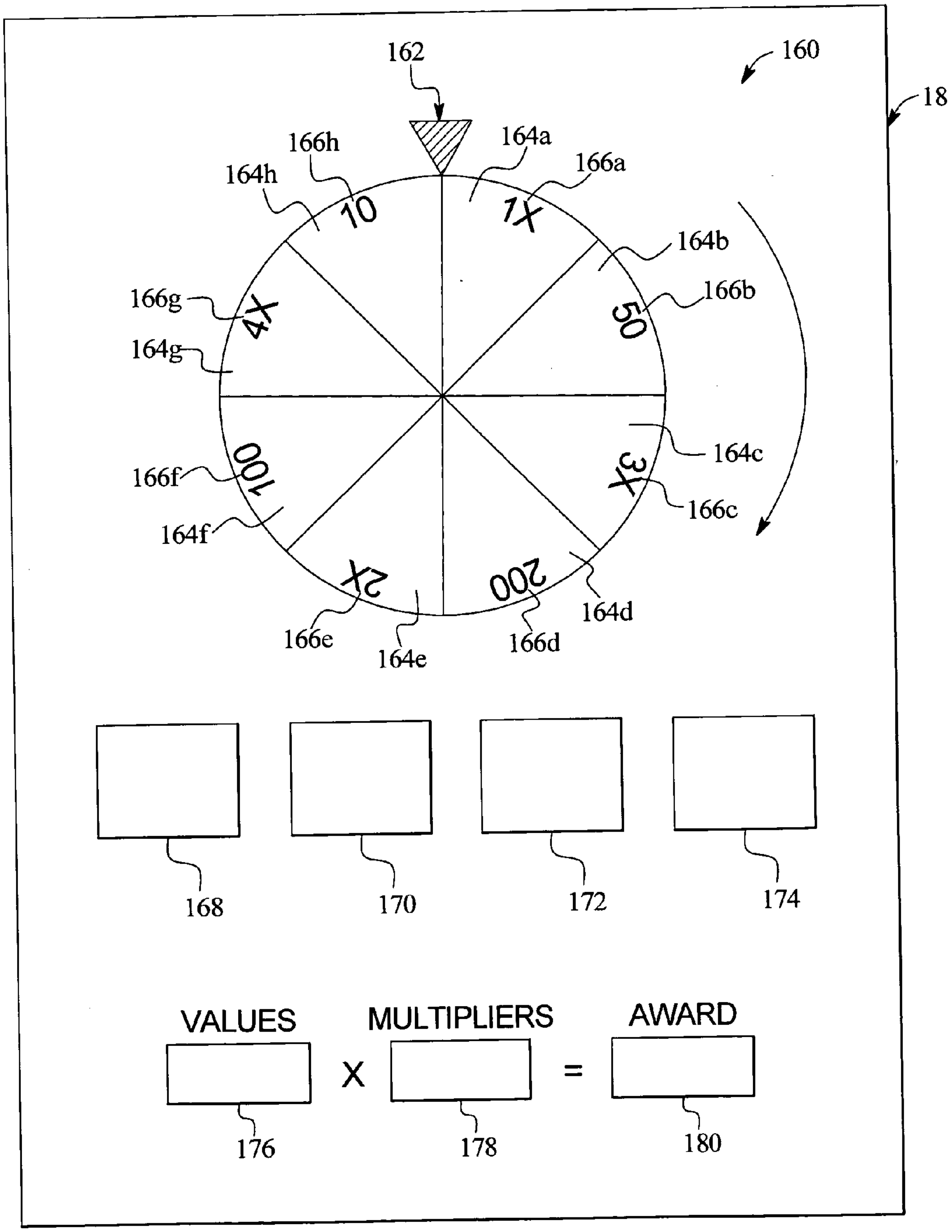
FIGS. 6A, 6B, 6C, 6D, 6E, 6F, 6G and 6H are front plan views of the display device of one embodiment of the present invention generally illustrating a symbol generator which includes activators and terminators, wherein the symbol generator interacts with player selectable selections.
Figure 6B:
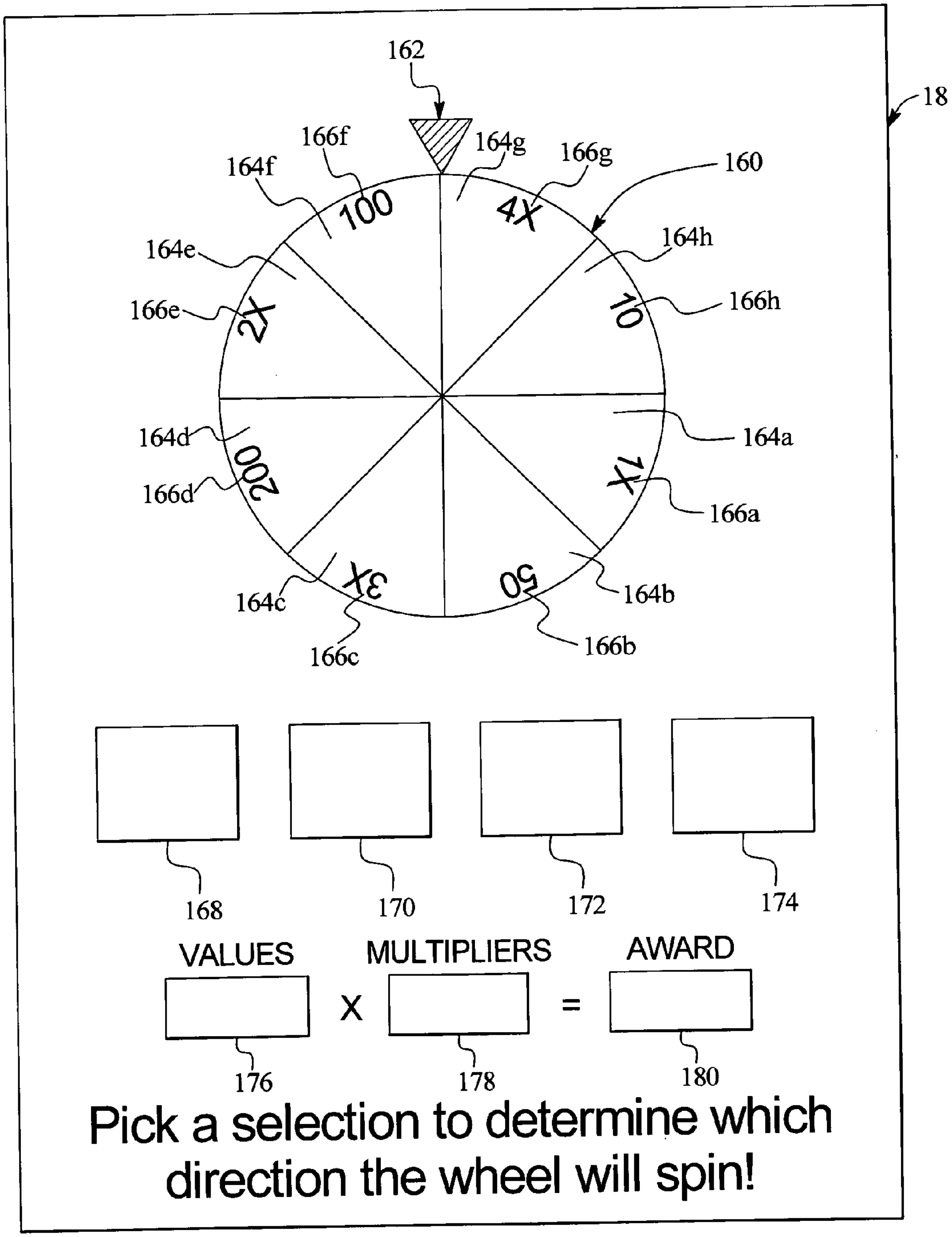
Figure 6C:
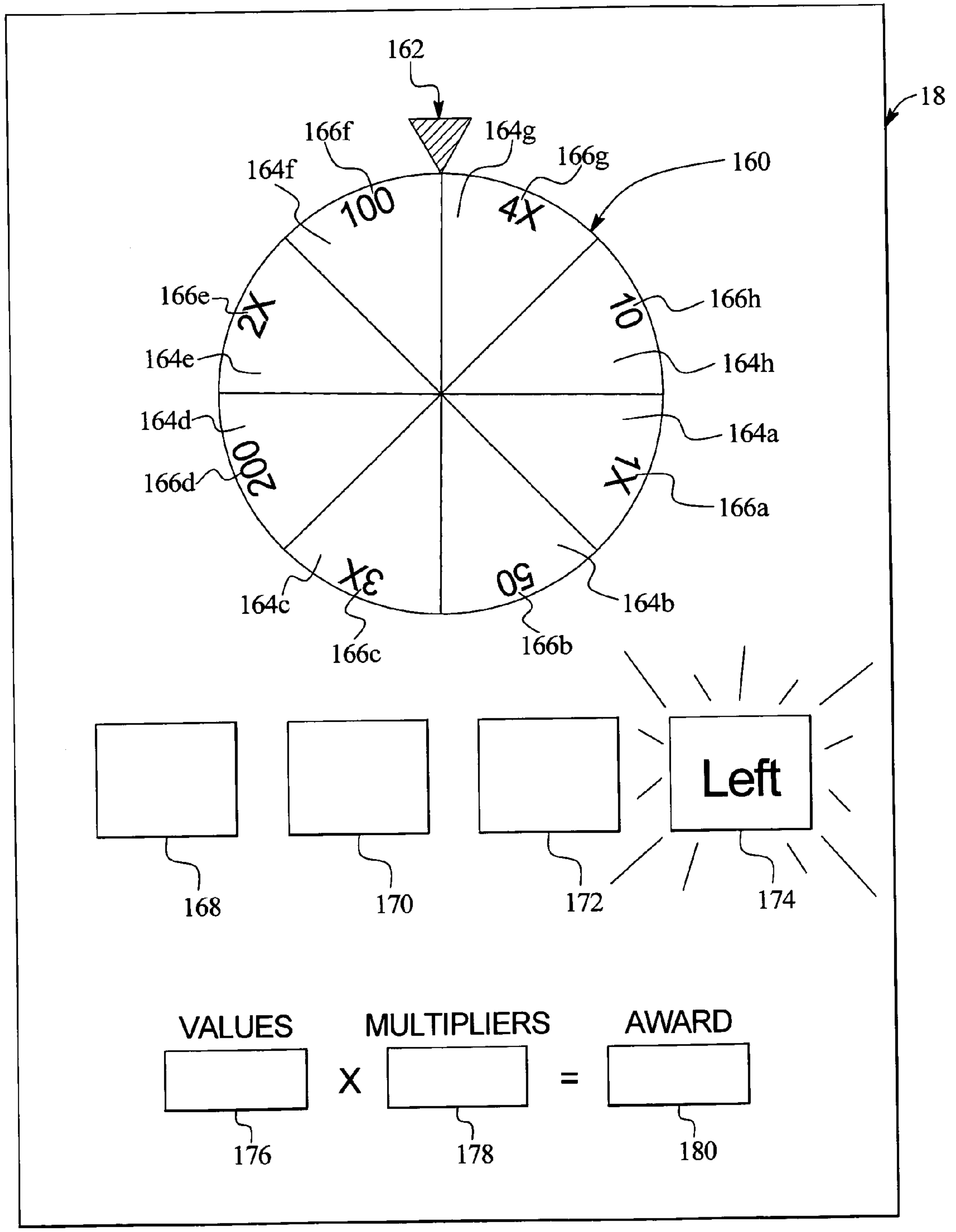
Figure 6D:
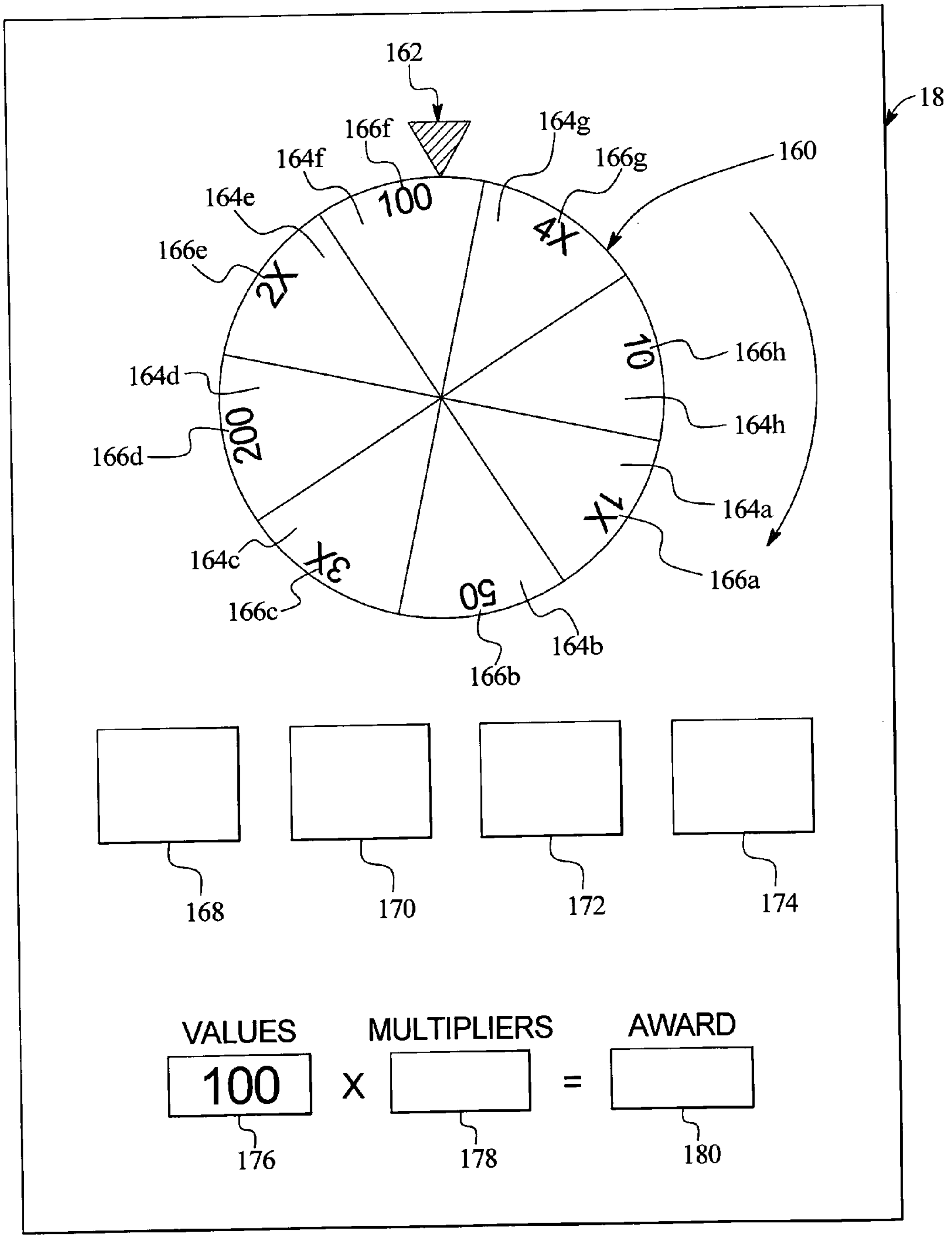

As illustrated in 6B, in this embodiment, the gaming device spins or rotates the wheel to indicate a point between two of the sections or symbols, the 100 symbol 166*f* and the 4× symbol 166*g*. The gaming device instructs the player to pick one of the selections to determine which symbol to indicate. As illustrated in FIG. 6C, the player chooses one of the selections 174 which is associated with the left direction. In one embodiment, (not illustrated) the gaming device begins the tease sequence described above before indicating the symbol in the direction. In one embodiment, as illustrated in FIG. 6D, the gaming device indicates the 100 symbol because it was to the left of the indicator 162. The value display 176 displays a value of 100. The gaming device spins the wheel again because the 100 symbol 166*f* is an activator symbol.

Figure 6E:
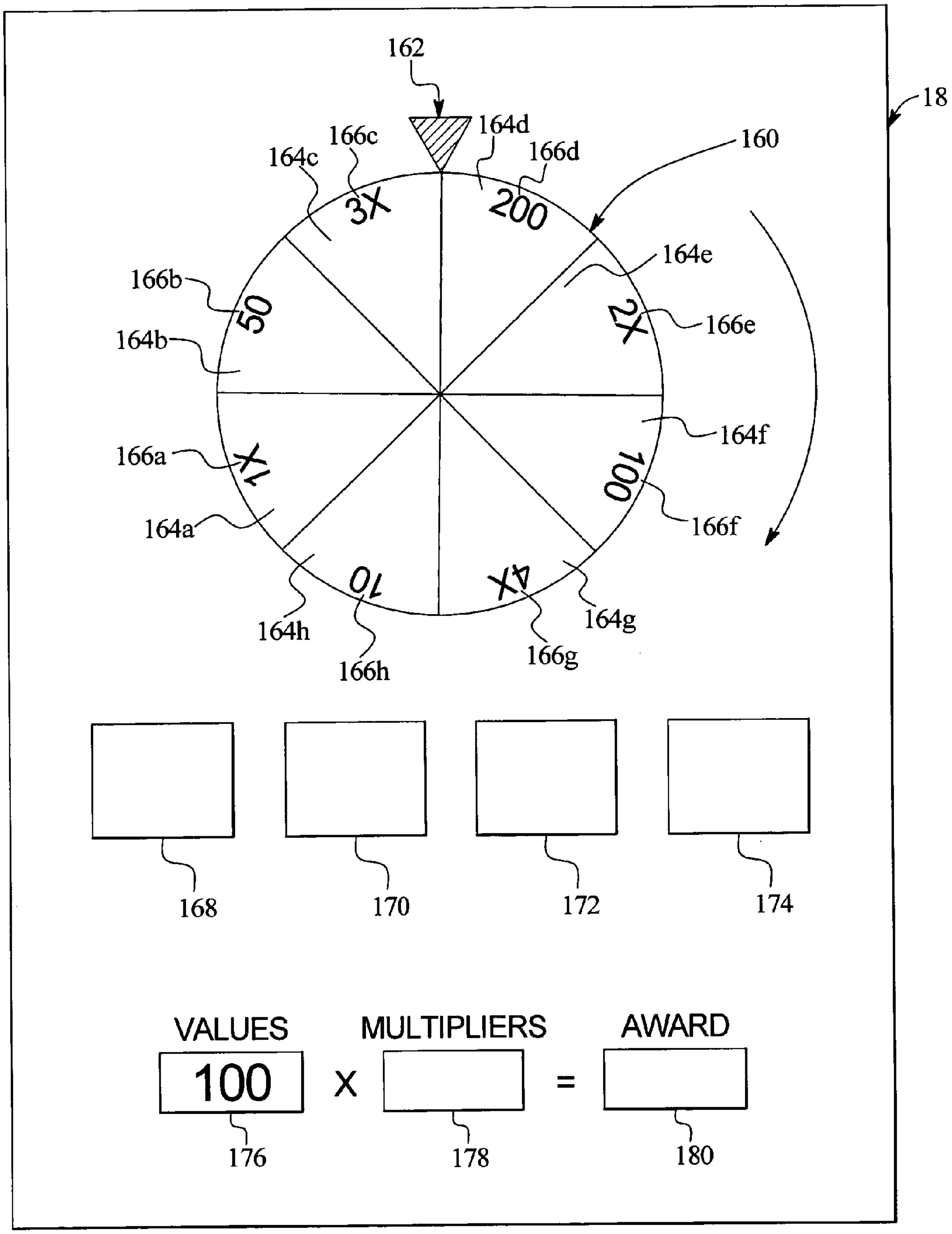
Figure 6F:
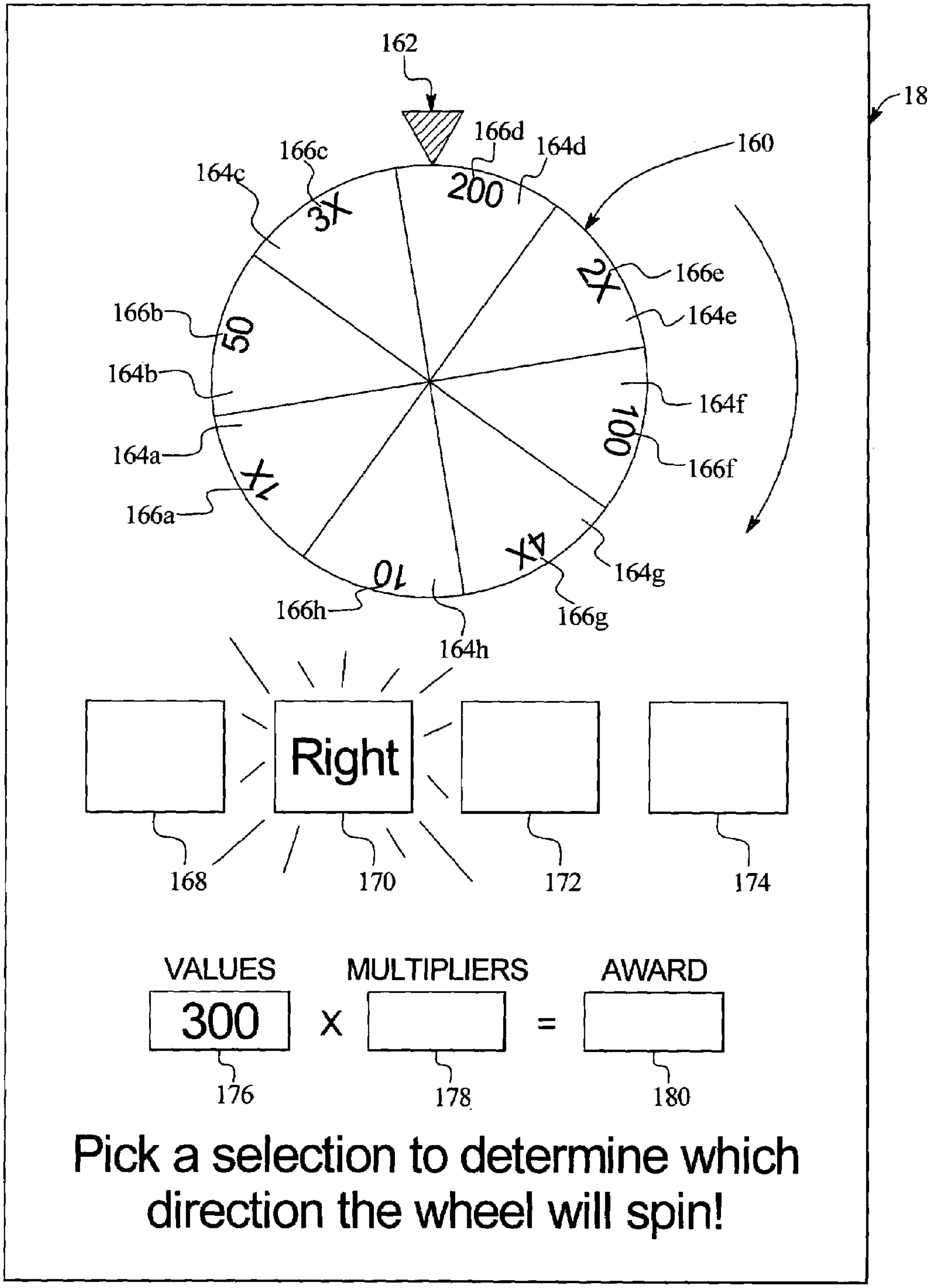

As illustrated in FIG. 6E, the gaming device stops rotating the wheel to indicate a point between the 3× symbol 166*c* and the 200 symbol 166*d*. The gaming device instructs the player to pick one of the selections. As illustrated in FIG. 6F, the player picks one of the symbols 170 which is associated with the direction of right. The gaming device rotates the wheel to indicate the 200 symbol 166*d* because it is located to the right of the indicator. The gaming device accumulates the 200 value. The value display 176 now displays a value of 300 for both of the spins. The gaming device spins the wheel again because the 200 symbol is a value symbol and therefore an activator. Thus, the indication of the 200 symbol activates the game to occur again. The gaming device spins the wheel again.

Figure 6G:
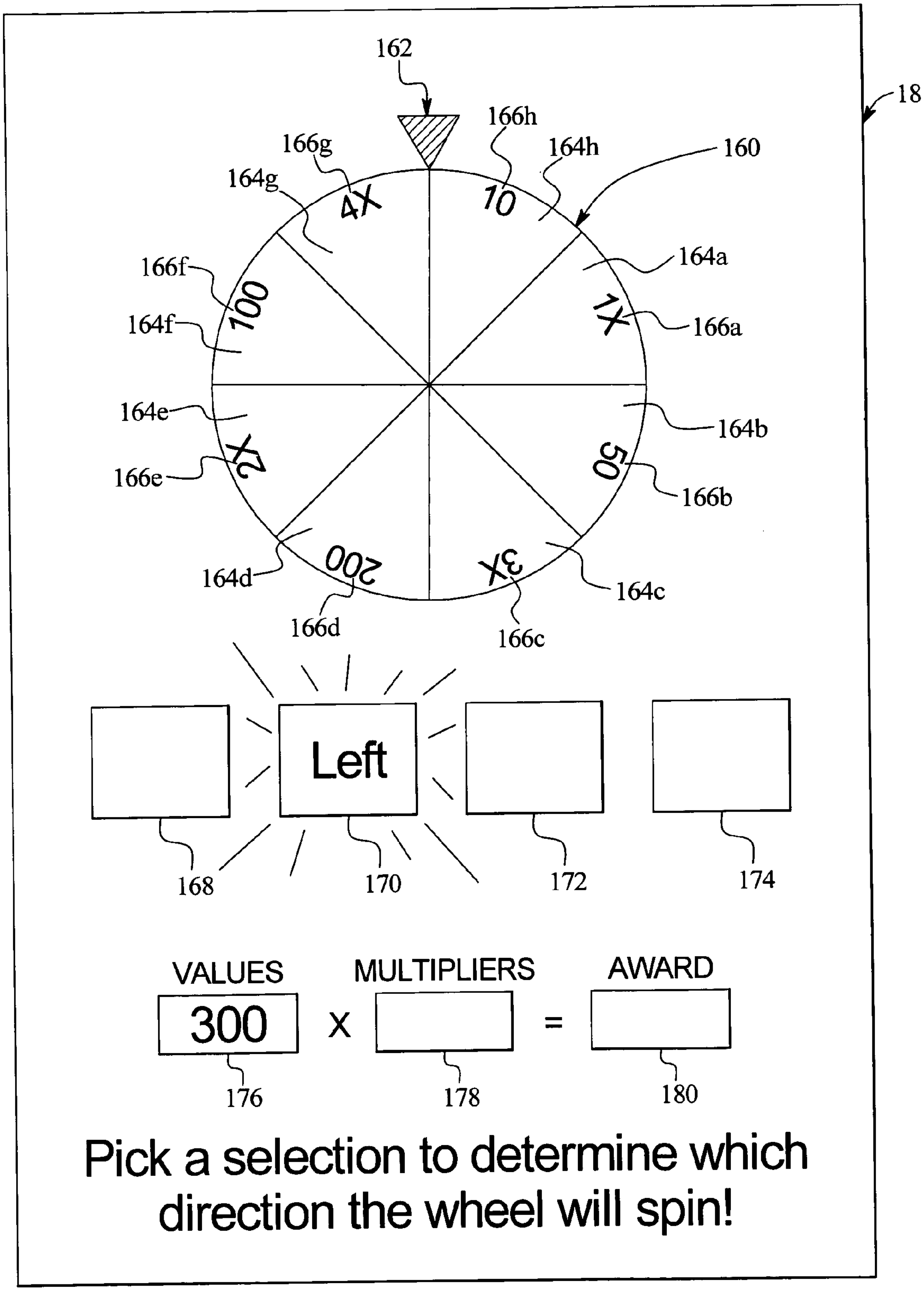
Figure 6H:
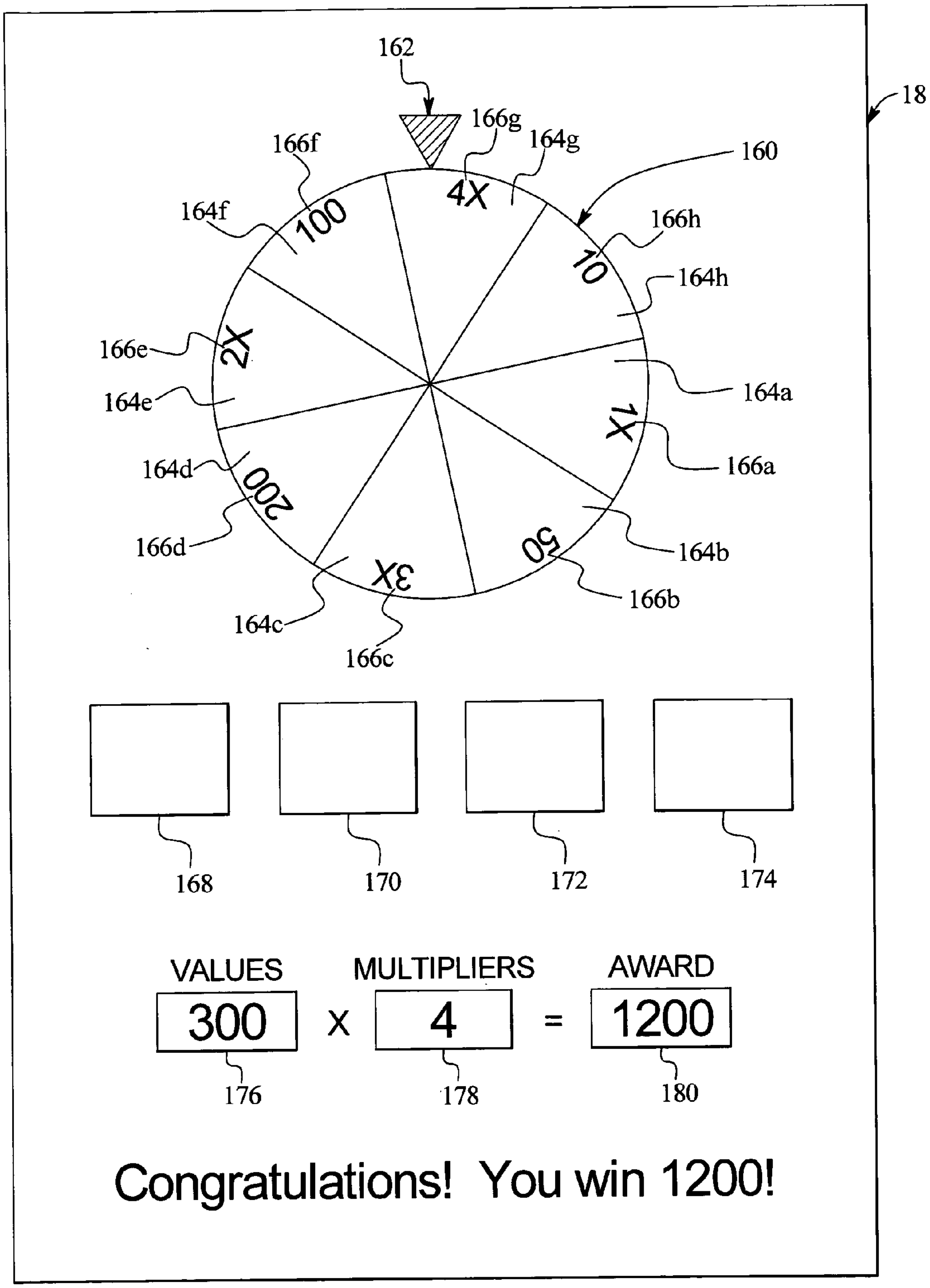

As illustrated in FIG. 6G, the gaming device stops rotating the wheel to indicate a point between the 4× symbol 166*g* and the 10 symbol 166*h*. The gaming device instructs the player to pick a selection. The player in response picks selection 170 as illustrated in FIG. 6H. The gaming device rotates the wheel to indicate the 4× symbol 166*g* because it is to the left of the indicator. The 4× symbol is a multiplier symbol and therefore functions as a terminator. The indication of the 4× symbol ends the game. The gaming device provides the player with an accumulated award based on all of the indicated selections. The gaming device provides the player with an award of 1200. The gaming device accumulates the value credits which equal 300 and multiplies 300 by the multiplier 4.

It should be appreciated that the tease sequence may be incorporated into the embodiments with player selections in any suitable fashion. In another embodiment, the selections are associated with a direction that represents the symbol to indicate in relation to the indicator. In another embodiment, the symbols are associated with directions which represent which way the wheel will spin.

For example, the wheel stops spinning so that the indicator is located between a section with a 50 symbol on the left and a 2× symbol on the right. A player selects a selection associated with the direction of left. After the tease sequence, the gaming device rotates the wheel to the left, indicating the 2× symbol.

In another embodiment, the game includes player interaction which at least partially determines which section the gaming device will indicate. For example, in one embodiment, the symbol generation game is a bonus game. The triggering event which initiates the bonus game influences which section or which symbol the gaming device indicates.

In another embodiment, the player is able to make a selection that at least partially influences which section is indicated. For example, the sections of a wheel are different colors. The gaming device enables the player to select a selection from a plurality of player selectable sections, which are each associated with one of the colors of the sections. The gaming device then indicates one of the sections based on the color the player selected.

It should be appreciated that the player selectable selections may be of any number and of any type. In one embodiment, the gaming device includes a plurality of symbol generators. In one embodiment, the gaming device includes a plurality of indicators. In one embodiment, the gaming device illuminates the indicators to indicate symbols or sections. In an alternative embodiment, the gaming device moves at least one indicator to indicate the sections or symbols. In yet another embodiment, the gaming device moves both the symbol generator and the indicator. It should be appreciated that the sections or the symbols may be associated with probabilities of being indicated.

In one embodiment, the gaming device oscillates the symbol generator to indicate two of the sections. In another embodiment, the gaming device moves the symbol generator to indicate points between a plurality of sections. In one embodiment, during the tease sequence, the gaming device moves the symbol generator to indicate the section associated with the determined symbol and one of the sections adjacent to that section. In another embodiment, the gaming device moves the symbol generator to indicate points on or between the section associated with the determined symbol and both sections adjacent to the section associated with the determined symbol. In another embodiment, the gaming device moves the indicator to indicate the sections or symbols.

In another embodiment, the gaming device displays a symbol generator including a plurality of sections and a plurality of symbols. Each section includes or is associated with one of said symbols. The gaming device determines a subset of sections to indicate and the subset includes at least two symbols. The gaming device indicates a first point of said symbol generator which is located in the subset of sections. The gaming device indicates one of the sections of the subset at least once and another one of the sections of the subset at least once. The gaming device designates and indicates one of the sections. The gaming device provides an outcome to a player based on the symbol associated with the designated section. It should be appreciated that the gaming device may indicate a point between the sections of the symbol generator or a point associated with or on one of the sections of the symbol generator.

In one embodiment, the gaming device determines which section to indicate and indicates more than one other section. For example, the gaming device may determine which section to indicate and indicate both of the adjacent sections at least once before indicating the determined section. In another embodiment, the gaming device may indicate one of the sections and then another non-adjacent section. It should be appreciated that the gaming device may indicate any suitable number of points before indicating a final symbol or a final section. It should be appreciated that the gaming device may indicate any suitable number of sections in any suitable location on the symbol generator.

The embodiments discussed above can involve multiple rounds and can involve any number of symbol generators which include any suitable number of symbols. These embodiments may be implemented in a primary or a secondary game. It should be appreciated that the present invention may involve any combination of disclosed embodiments. Furthermore, these embodiments can incorporate any type of theme for entertainment purposes.

While the present invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the claims. It is thus to be understood that modifications and variations in the present invention may be waived without departing from the novel aspects of this invention as defined in the claims, and that this application is only to be limited by the scope of the claims.

The invention is claimed as follows:

1. A method for operating a gaming device, said method comprising:

(a) displaying a symbol generator including a plurality of sections and a plurality of symbols, wherein each section includes one of said symbols;

(b) determining one of said symbols to indicate for a single activation of the symbol generator, said single activation including a plurality of movements of said symbol generator;

(c) after determining one of said symbols to indicate for said single activation of the symbol generator:

(i) moving said symbol generator;

(ii) stopping said movement of the symbol generator to cause an indicator to indicate a first point of said symbol generator, wherein said first point is a non-symbol position that is located between the section associated with said determined symbol and another one of the sections;

(iii) after stopping said movement of the symbol generator to cause the indicator to indicate the first point, causing the indicator to indicate said other section at least once;

(iv) after causing the indicator to indicate said other section at least once, causing the indicator to indicate the section associated with said determined symbol at least once; and (v) after causing the indicator to indicate the section associated with said determined symbol at least once, causing a final indication of said section associated with said determined symbol; and (d) providing an outcome to a player based on said determined symbol.

2. The method of claim 1, wherein the symbol generator is selected from a group consisting of: reels, dice and wheels.

3. The method of claim 1, which includes moving said indicator to indicate the first point and said section associated with said determined symbol.

4. The method of claim 1, which includes providing a mechanical symbol generator and rotating the symbol generator about an axis.

5. The method of claim 1, wherein said plurality of symbols includes modifier symbols and award value symbols.

6. The method of claim 1, wherein said other section is adjacently arranged to said determined section.

7. The method of claim 1, which includes designating a plurality of the symbols as terminators and repeating steps (b) to (d) until the gaming device indicates a terminator.

8. The method of claim 1, which includes repeating steps (b) to (d) a predetermined number of times.

9. The method of claim 1, which includes repeating steps (b) to (d), accumulating all of the determined symbols and basing an outcome on the accumulated determined symbols.

10. The method of claim 1, which includes indicating the other section and then indicating a second section and then indicating the section associated with the determined symbol.

11. The method of claim 10, wherein the determined symbol and the other symbol are adjacently arranged.

12. A method for operating a gaming device, said method comprising:

(a) displaying a symbol generator including a plurality of sections, wherein each section includes one of a plurality of symbols;

(b) determining a subset of sections to indicate for a single activation of the symbol generator, said single activation including a plurality of indications of the sections of said symbol generator, wherein said subset includes at least two sections;

(c) after determining a subset of sections to indicate for said single activation of the symbol generator:

(i) indicating a first point of said symbol generator, wherein said first point is located in the subset of sections and said first point is a non-symbol position;

(ii) after indicating the first point, indicating one of the sections of the subset at least once;

(iii) after indicating one of the sections of the subset at least once, indicating another one of the sections of the subset at least once; and (iv) indicating another one of the sections of the subset at least once, designating and indicating one of the sections of the subset; and (d) providing an outcome to a player based on said symbol associated with the designated section.

13. The method of claim 12, wherein the symbol generator is selected from a group consisting of: reels, dice and wheels.

14. The method of claim 12, which includes moving said indicator to indicate said first point.

15. The method of claim 12, which includes providing a mechanical symbol generator and rotating the symbol generator about an axis.

16. The method of claim 12, wherein said plurality of symbols includes modifier symbols and award value symbols.

17. The method of claim 12, wherein said subset of sections include adjacently arranged sections.

18. The method of claim 12, which includes designating a plurality of the symbols as terminators and repeating steps (b) to (g) until the gaming device indicates a terminator.

19. The method of claim 12, which includes repeating steps (b) to (g) a predetermined number of times.

20. The method of claim 12, which includes repeating steps (b) to (g), accumulating all of the determined symbols and basing an outcome on the accumulated determined symbols.

21. The method of claim 12, which includes moving said symbol generator to cause the indication of the sections.

22. The method of claim 12, wherein said first point is located between two of the sections of the subset of sections.

* * * * *